US012810830B2

(12) United States Patent
Itoh

(10) Patent No.: US 12,810,830 B2
(45) Date of Patent: Nov. 24, 2026

(54) ELECTRONIC MUSICAL INSTRUMENT, ELECTRONIC MUSICAL INSTRUMENT CONTROL METHOD, AND STORAGE MEDIUM

(71) Applicant: CASIO COMPUTER CO., LTD., Tokyo (JP)

(72) Inventor: Naoaki Itoh, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 929 days.

(21) Appl. No.: 18/182,062

(22) Filed: Mar. 10, 2023

(65) Prior Publication Data

US 2023/0317037 A1 Oct. 5, 2023

Related U.S. Application Data

(63) Continuation of application No. PCT/JP2021/030256, filed on Aug. 18, 2021.

(30) Foreign Application Priority Data

Sep. 11, 2020 (JP) ................................ 2020-152924

(51) Int. Cl.
*G10H 1/14* (2006.01)
*G10H 1/053* (2006.01)
*G10H 1/18* (2006.01)

(52) U.S. Cl.
CPC ............... *G10H 1/14* (2013.01); *G10H 1/053* (2013.01); *G10H 1/186* (2013.01); *G10H 2210/271* (2013.01)

(58) Field of Classification Search
CPC .......... G10H 1/14; G10H 1/053; G10H 1/186; G10H 2210/271

(Continued)

(56) References Cited

U.S. PATENT DOCUMENTS 5,648,629 A * 7/1997 Kozuki .................... G10H 1/06 84/625
10,049,651 B1 * 8/2018 Matsunaga ............ G10H 1/053
(Continued)

FOREIGN PATENT DOCUMENTS

CN 108735190 B 7/2023
JP H06214563 A 8/1994
(Continued)

OTHER PUBLICATIONS

International Search Report dated Oct. 12, 2021 issued in PCT/JP2021/030256.

(Continued)

*Primary Examiner* — Christina M Schreiber
(74) *Attorney, Agent, or Firm* — Scully, Scott, Murphy & Presser, P.C.

(57) ABSTRACT

An electronic musical instrument comprising a plurality of keys that includes a first and a second key having a pitch in a harmonic relationship with a pitch of the first key; and at least one processor, wherein the at least one processor performs the following: deciding, in response to a operation of a first key, whether the second key is in a damped state or in a non-damped state; generating, in a case where the second key is in the non-damped state, a resonance tone corresponding to the second key with at least one of a first resonance pitch and a first timbre; and generating, in a case where the second key is in the damped state, the resonance tone corresponding to the second key with at least one of a second resonance pitch and a second timbre.

13 Claims, 12 Drawing Sheets

(58) Field of Classification Search
USPC ........................................................... 84/662
See application file for complete search history.

(56) References Cited

U.S. PATENT DOCUMENTS

| | | | | |
|---|---|---|---|---|
| 2002/0166441 | A1* | 11/2002 | Washiyama | G10H 1/125 84/662 |
| 2007/0175318 | A1* | 8/2007 | Izumisawa | G10H 1/0091 84/626 |
| 2009/0266219 | A1* | 10/2009 | Nakae | G10H 1/125 84/229 |
| 2015/0269922 | A1* | 9/2015 | Matsunaga | G10H 7/00 84/605 |
| 2016/0284329 | A1* | 9/2016 | Itoh | G10H 1/06 |
| 2021/0295806 | A1* | 9/2021 | Sakata | G10H 1/125 |
| 2023/0317037 | A1* | 10/2023 | Itoh | G10H 1/08 84/662 |

FOREIGN PATENT DOCUMENTS

| | | | | | |
|---|---|---|---|---|---|
| JP | H09330079 | A | | 12/1997 | |
| JP | 2002311947 | A | * | 10/2002 | |
| JP | 3546779 | B2 | * | 7/2004 | |
| JP | 2004317615 | A | * | 11/2004 | |
| JP | 3671545 | B2 | * | 7/2005 | G10H 1/188 |
| JP | 2016180816 | A | * | 10/2016 | G10H 1/44 |
| JP | 2018106006 | A | * | 7/2018 | G10H 1/125 |
| JP | 6690763 | B2 | | 4/2020 | |

OTHER PUBLICATIONS

Extended European search report dated Sep. 16, 2024 received in European Patent Application No. 21866477.9.
First Office Action dated Jul. 16, 2025 received in Chinese Patent Application No. 202180062215.4.

* cited by examiner

FIG. 3

| KEY NUMBER | KEY NOTE | NON-DAMPED STATE FIRST RESONANCE PITCH | DAMPED STATE SECOND RESONANCE PITCH | SUPPLEMENTARY |
|---|---|---|---|---|
| 1 | A0 | A0 | E2 | THIRD OVERTONE |
| 2 | A#0 | A#0 | F2 | THIRD OVERTONE |
| 3 | B0 | B0 | F#2 | THIRD OVERTONE |
| 4 | C1 | C1 | G2 | THIRD OVERTONE |
| 5 | C#1 | C#1 | G#2 | THIRD OVERTONE |
| 6 | D1 | D1 | A2 | THIRD OVERTONE |
| 7 | D#1 | D#1 | A#2 | THIRD OVERTONE |
| 8 | E1 | E1 | B2 | THIRD OVERTONE |
| 9 | F1 | F1 | F2 | SECOND OVERTONE |
| 10 | F#1 | F#1 | F#2 | SECOND OVERTONE |
| 11 | G1 | G1 | G2 | SECOND OVERTONE |
| 12 | G#1 | G#1 | G#2 | SECOND OVERTONE |
| 13 | A1 | A1 | A2 | SECOND OVERTONE |
| 14 | A#1 | A#1 | A#2 | SECOND OVERTONE |
| 15 | B1 | B1 | B2 | SECOND OVERTONE |
| 16 | C2 | C2 | C3 | SECOND OVERTONE |
| 17 | C#2 | C#2 | C#3 | SECOND OVERTONE |
| 18 | D2 | D2 | D3 | SECOND OVERTONE |
| 19 | D#2 | D#2 | D#3 | SECOND OVERTONE |
| 20 | E2 | E2 | E3 | SECOND OVERTONE |
| 21 | F2 | F2 | F3 | SECOND OVERTONE |
| 22 | F#2 | F#2 | F#3 | SECOND OVERTONE |
| 23 | G2 | G2 | G3 | SECOND OVERTONE |
| 24 | G#2 | G#2 | G#3 | SECOND OVERTONE |
| 25 | A2 | A2 | A3 | SECOND OVERTONE |
| 26 | A#2 | A#2 | A#3 | SECOND OVERTONE |
| 27 | B2 | B2 | B3 | SECOND OVERTONE |
| 28 | C3 | C3 | C4 | SECOND OVERTONE |
| 29 | C#3 | C#3 | C#4 | SECOND OVERTONE |
| 30 | D3 | D3 | D4 | SECOND OVERTONE |
| 31 | D#3 | D#3 | D#4 | SECOND OVERTONE |
| 32 | E3 | E3 | E4 | SECOND OVERTONE |
| 33 | F3 | F3 | F4 | SECOND OVERTONE |
| 34 | F#3 | F#3 | F#4 | SECOND OVERTONE |
| 35 | G3 | G3 | G4 | SECOND OVERTONE |
| 36 | G#3 | G#3 | G#4 | SECOND OVERTONE |
| 37 | A3 | A3 | A4 | SECOND OVERTONE |
| 38 | A#3 | A#3 | A#4 | SECOND OVERTONE |
| 39 | B3 | B3 | B4 | SECOND OVERTONE |
| 40 | C4 | C4 | C5 | SECOND OVERTONE |
| 41 | C#4 | C#4 | C#5 | SECOND OVERTONE |
| 42 | D4 | D4 | D5 | SECOND OVERTONE |
| 43 | D#4 | D#4 | D#5 | SECOND OVERTONE |
| 44 | E4 | E4 | E5 | SECOND OVERTONE |

FIG. 4

| KEY NUMBER | KEY NOTE | NON-DAMPED STATE FIRST RESONANCE PITCH | DAMPED STATE SECOND RESONANCE PITCH | SUPPLEMENTARY |
|---|---|---|---|---|
| 45 | F4 | F4 | F5 | SECOND OVERTONE |
| 46 | F#4 | F#4 | F#5 | SECOND OVERTONE |
| 47 | G4 | G4 | G5 | SECOND OVERTONE |
| 48 | G#4 | G#4 | G#5 | SECOND OVERTONE |
| 49 | A4 | A4 | A5 | SECOND OVERTONE |
| 50 | A#4 | A#4 | A#5 | SECOND OVERTONE |
| 51 | B4 | B4 | B5 | SECOND OVERTONE |
| 52 | C5 | C5 | C6 | SECOND OVERTONE |
| 53 | C#5 | C#5 | C#6 | SECOND OVERTONE |
| 54 | D5 | D5 | - | NO RESONANCE |
| 55 | D#5 | D#5 | - | NO RESONANCE |
| 56 | E5 | E5 | - | NO RESONANCE |
| 57 | F5 | F5 | - | NO RESONANCE |
| 58 | F#5 | F#5 | - | NO RESONANCE |
| 59 | G5 | G5 | - | NO RESONANCE |
| 60 | G#5 | G#5 | - | NO RESONANCE |
| 61 | A5 | A5 | - | NO RESONANCE |
| 62 | A#5 | A#5 | - | NO RESONANCE |
| 63 | B5 | B5 | - | NO RESONANCE |
| 64 | C6 | C6 | - | NO RESONANCE |
| 65 | C#6 | C#6 | - | NO RESONANCE |
| 66 | D6 | D6 | - | NO RESONANCE |
| 67 | D#6 | D#6 | - | NO RESONANCE |
| 68 | E6 | E6 | - | NO RESONANCE |
| 69 | F6 | F6 | STRINGS WHICH ARE FREE AT ALL TIMES BECAUSE OF RANGE WITH NO DAMPER | |
| 70 | F#6 | F#6 | | |
| 71 | G6 | G6 | | |
| 72 | G#6 | G#6 | | |
| 73 | A6 | A6 | | |
| 74 | A#6 | A#6 | | |
| 75 | B6 | B6 | | |
| 76 | C7 | C7 | | |
| 77 | C#7 | C#7 | | |
| 78 | D7 | D7 | | |
| 79 | D#7 | D#7 | | |
| 80 | E7 | E7 | | |
| 81 | F7 | F7 | | |
| 82 | F#7 | F#7 | | |
| 83 | G7 | G7 | | |
| 84 | G#7 | G#7 | | |
| 85 | A7 | A7 | | |
| 86 | A#7 | A#7 | | |
| 87 | B7 | B7 | | |
| 88 | C8 | C8 | | |

FIG. 5A

| No. | PITCH DIFFERENCE (CHROMATIC SCALE) | RESONANCE STRENGTH RATIO | SUPPLEMENTARY (HARMONICS) |
|---|---|---|---|
| 0 | 0 | 1 | 1 |
| 1 | 12 | 1 | 2 |
| 2 | 19 | 0.8 | 3 |
| 3 | 24 | 0.8 | 4 |
| 4 | 28 | 0.6 | 5 |
| 5 | 31 | 0.4 | 6 |
| 6 | 36 | 0.2 | 8 |

FIG. 5B

| PITCH DIFFERENCE (CHROMATIC SCALE) | RESONANCE PITCH CANDIDATE | RESONANCE STRENGTH RATIO CANDIDATE |
|---|---|---|
| -24 | C1 | 0.8 |
| -19 | F1 | 0.8 |
| -12 | C2 | 1 |
| ±0 | C3 | 1 |
| +12 | C4 | 1 |
| +19 | G4 | 0.8 |
| +24 | C5 | 0.8 |
| +28 | E5 | 0.6 |
| +31 | G5 | 0.4 |
| +36 | C6 | 0.2 |

FIG. 5C

| PRODUCIBLE RESONANCE KEY NOTE | PRODUCIBLE RESONANCE TIMBRE | PRODUCIBLE RESONANCE PITCH | PRODUCIBLE RESONANCE STRENGTH |
|---|---|---|---|
| C2 | NON-FREE-STRING RESONANCE TIMBRE | C3 | VELOCITY×1 |
| G3 | NON-FREE-STRING RESONANCE TIMBRE | G4 | VELOCITY×0.8 |
| G4 | FREE-STRING RESONANCE TIMBRE | G4 | VELOCITY×0.8 |
| E4 | NON-FREE-STRING RESONANCE TIMBRE | E5 | VELOCITY×0.6 |
| C5 | NON-FREE-STRING RESONANCE TIMBRE | C6 | VELOCITY×0.2 |

ELECTRONIC MUSICAL INSTRUMENT, ELECTRONIC MUSICAL INSTRUMENT CONTROL METHOD, AND STORAGE MEDIUM

CROSS REFERENCE TO RELATED APPLICATIONS

This application is a continuation of International Patent Application No. PCT/JP2021/030256 filed on Aug. 18, 2021, and claims priority to Japanese Patent Application No. 2020-152924 filed on Sep. 11, 2020, the entire content of both of which is incorporated herein by reference.

TECHNICAL FIELD

The present invention relates to an electronic musical instrument, a method, and a program that enable production of a resonance tone.

BACKGROUND ART

There is a known electronic musical instrument that produces tones with resonance effect between strings at the time of depression of a damper pedal or at the time of pressing of a plurality of keyboards in the electronic musical instrument (e.g., technology in Japanese Patent No. JP6690763B2).

According to the above conventional technology, a resonance tone corresponding to a key-pressing tone is produced only to a free string, such as a string released by detachment of a damper due to key pressing or depression of the damper pedal, or a string, which is free at all times, for a high-frequency key having no damper structure or an aliquot.

SUMMARY OF THE INVENTION

An actual acoustic piano causes, even in a case where a string provided with a damper is in the state in which the damper is not detached (damped state), the resonance of the string, leading to an enriched note of the piano. However, the conventional technology has no means for achieving the effect of such a damped state, leading to difficulty in reproducing resonance effect based on the effect of the damped state in an acoustic piano.

The present disclosure is to enable production of a favorable resonance tone.

In one aspect, the present disclosure provides an electronic musical instrument comprising a plurality of keys that includes a first and a second key having a pitch in a harmonic relationship with a pitch of the first key; and at least one processor, wherein the at least one processor performs the following: deciding, in response to a operation of a first key, whether the second key is in a damped state or in a non-damped state; generating, in a case where the second key is in the non-damped state, a resonance tone corresponding to the second key with at least one of a first resonance pitch and a first timbre; and generating, in a case where the second key is in the damped state, the resonance tone corresponding to the second key with at least one of a second resonance pitch and a second timbre.

According to the present invention, it is possible to enable production of a favorable resonance tone.

BRIEF DESCRIPTION OF THE DRAWINGS

FIG. 3 illustrates an exemplary configuration of key-based resonance pitch calculation table data (part 1).

FIG. 4 illustrates an exemplary configuration of key-based resonance pitch calculation table data (part 2).

FIGS. 5A-5C illustrate respective exemplary configurations of pitch-difference-based resonance strength table data, key-pressing-compatible resonance-pitch candidate table data, and producible resonance-tone information table data.

DETAILED DESCRIPTION OF EMBODIMENTS

Figure 1:
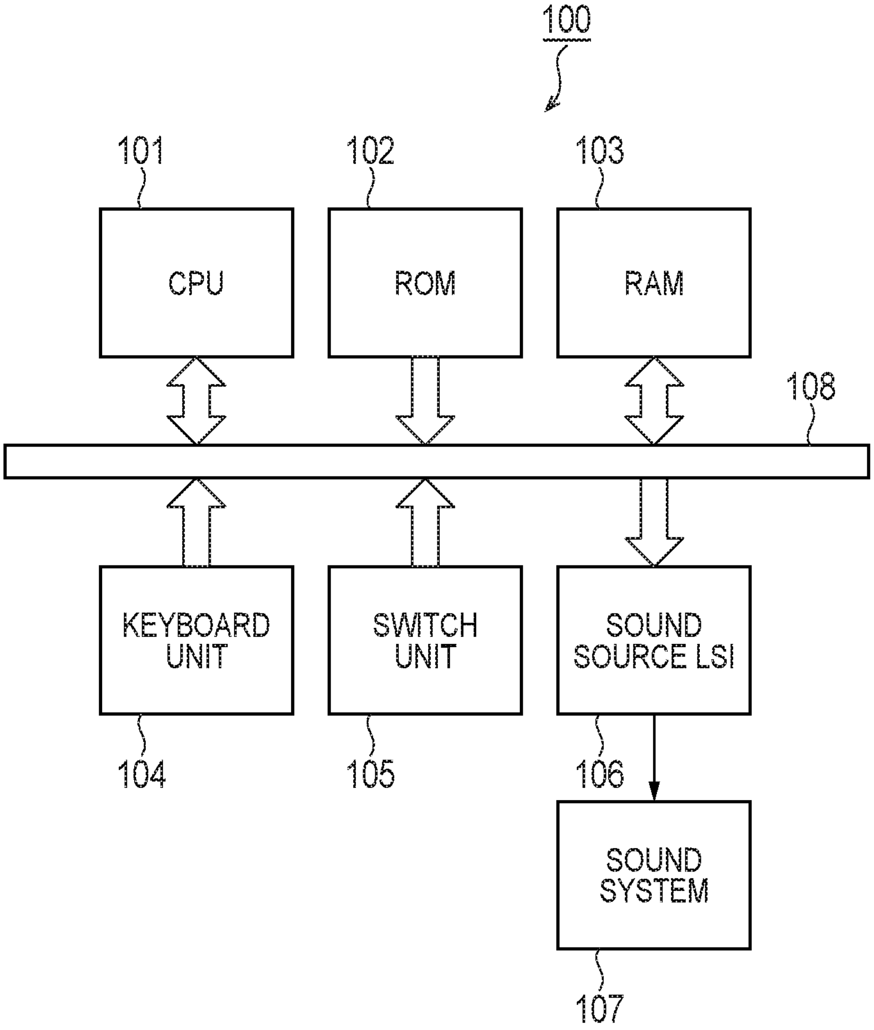
FIG. 1 illustrates an exemplary hardware configuration of an embodiment of an electronic musical instrument.

Modes for carrying out the present invention will be described in detail below with reference to the drawings. FIG. 1 illustrates an exemplary hardware configuration of an embodiment of an electronic keyboard instrument as an exemplary electronic musical instrument. Referring to FIG. 1, the electronic keyboard instrument 100 serves, for example, as an electronic piano and includes a central processing unit (CPU) 101, a read-only memory (ROM) 102, a random-access memory (RAM) 103, a keyboard unit 104, a switch unit 105, and a sound source LSI 106 that are mutually connected through a system bus 108. An output from the sound source LSI 106 is input to a sound system 107.

With the RAM 103 as a working memory, the CPU 101 loads, into the RAM 103, a control program stored in the ROM 102 and executes the control program, resulting in execution of the control operation of the electronic musical instrument 100 in FIG. 1.

The keyboard unit 104 detects a pressing or releasing operation on each key and notifies the CPU 101 thereof, in which the keys serve as a plurality of playing operators.

The switch unit 105 detects operations on various types of switches by the player and notifies the CPU 101 thereof. The switch unit 105 includes a damper pedal.

The sound source LSI 106 generates digital musical-tone waveform data, based on tone-production instruction data input from the CPU 101, and outputs the digital musical-tone waveform data to the sound system 107. After converting, into an analog musical-tone waveform signal, the digital musical-tone waveform data input from the sound source LSI 106, the sound system 107 amplifies the analog musical-tone waveform signal through a built-in amplifier and produces sound through a built-in speaker.

The sound source LSI 106 serves as a dedicated large-scale integrated circuit that performs musical-tone generation processing to be described below. Based on a command from the CPU 101, the sound source LSI 106 reads, from a waveform memory not particularly illustrated, waveform data at a rate corresponding to the pitch of a key specified by playing, adds the amplitude envelope of velocity specified by playing to the read waveform data, and outputs the resultant waveform data as output musical-tone waveform data.

Figure 2:
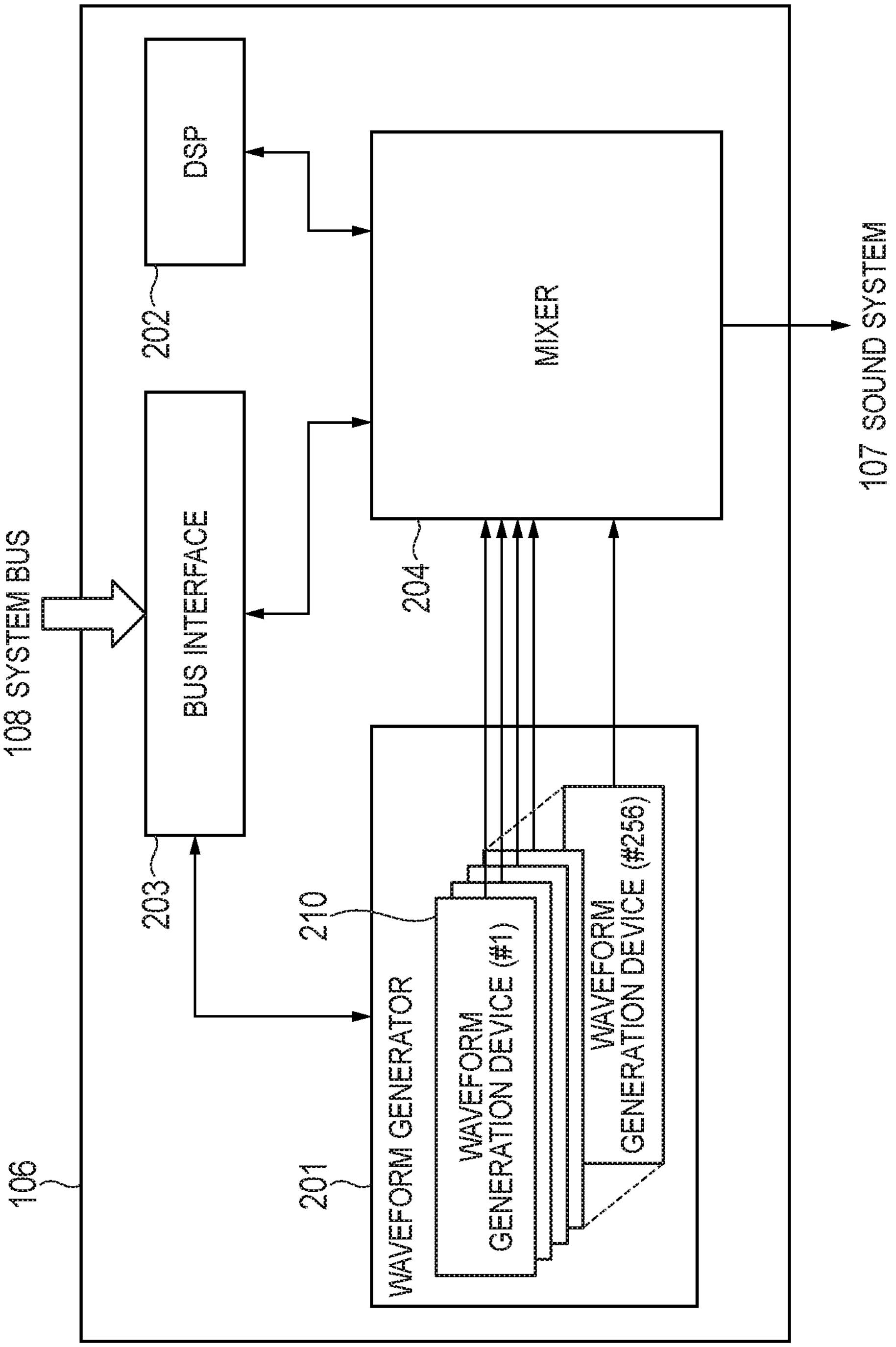
FIG. 2 is a block diagram of an exemplary configuration of a sound source LSI.

FIG. 2 is a block diagram of an exemplary configuration of the sound source LSI 106 in FIG. 1. The sound source LSI 106 includes a waveform generator 201 that includes waveform generation devices 210 (#1 to #256) and enables simultaneous oscillation of 256 pieces of waveform data, a digital signal processor (DSP) 202, a mixer 204, and a bus interface 203. For access to the RAM 103 and communication with the CPU 101 in FIG. 1, the waveform generator 201, the DSP 202, and the mixer 204 are connected to the system bus 108 in FIG. 1 through the bus interface 203.

Each of the waveform generation devices 210 (#1 to #256) in the waveform generator 201 serves as an oscillator that operates, for example, due to time sharing, reads waveform data from a waveform ROM not particularly illustrated, and reproduces the waveform of a timbre. The DSP 202 serves as a digital signal processing circuit that causes an acoustic effect on a sound signal. The mixer 204 mixes respective signals from the waveform generation devices 210 or performs signal transmission to or signal reception from the DSP 202 to control the flow of the entire sound signal for outward output. That is, with the DSP 202, the mixer 204 adds, to the waveform data read from the waveform ROM by each waveform generation device 210 in the waveform generator 201 in accordance with playing, an envelope corresponding to a musical-tone parameter supplied from the CPU 101, leading to output of output musical-tone waveform data. The musical-tone output data of the mixer 204 is output to the sound system 107 in FIG. 1. Then, through a D/A converter and an amplifier not particularly illustrated in the sound system 107, the musical-tone output data is output, as an analog musical-tone signal at a predetermined signal level, for example, to a speaker or headphones not particularly illustrated.

FIGS. 3 and 4 each illustrate an exemplary configuration of key-based resonance pitch calculation table data. The key-based resonance pitch calculation table data serves as table data in which, regarding each key of the keyboard unit 104 of which the number of keys is, for example, 88, stored are a key note indicating the pitch of the key pressed due to playing, a first resonance pitch that simulates the vibration of the piano string (hereinafter, simply referred to as a "string") of the key in the non-damped state (free string), and a second resonance pitch that simulates the vibration of the string of the key in the damped state. For example, in response to power-on of the electronic keyboard instrument 100, the key-based resonance pitch calculation table data is loaded from the ROM 102 to the RAM 103 in FIG. 1. Note that the section "supplementary" in FIGS. 3 and 4 is provided as a display for describing an embodiment and thus is not included in the key-based resonance pitch calculation table data.

In an actual acoustic piano, as a basic operation, a free string in the non-damped state, such as a string released by detachment of a damper due to key pressing or depression of the damper pedal, or a string, which is free at all times, for a high-frequency key having no damper structure or an aliquot, vibrates in resonance with the vibration of a string corresponding to a key-pressing tone, so that a resonance tone is produced. However, in addition to such a basic operation, a string, provided with a damper, in the damped state in which the damper is not detached resonates with the string of the pressed key, leading to production of an enriched note of the piano. In this case, as indicated in the section "supplementary" in FIGS. 3 and 4, the second resonance pitch when the string for a key note is in the damped state and vibrates for a resonance tone is three times or twice the frequency of the first resonance pitch corresponding to the original frequency of the string when the string is in the non-damped state. This can change depending on the range of the key note or depending on the manufacturer or type of the acoustic piano. Furthermore, in such an actual acoustic piano, for example, as exemplified with key numbers 54 to 68 in FIG. 4, there are strings designed structurally not to resonate. In addition, as exemplified with key numbers 69 to 88, there are strings, in a high-tone range, that each have structurally no damper and resonate at the first resonance pitch at all times in the non-damped state. Furthermore, although not illustrated, in a system called aliquot stringing, there are strings each serving as an additional (fourth) string called an aliquot string in each individual range of three octaves on the high-tone side, in which the additional string is stretched at a position slightly higher than the other three strings such that the additional string is not struck by a hammer, and when the hammer strikes the conventional three strings, the aliquot string resonates at the first resonance pitch at all times in the non-damped state. Aliquot stringing broadens vibrational energy throughout the instrument, leading to creation of an unusually complex and colorful timbre. In addition, the key note, first resonance pitch, and second resonance pitch allocated to each key slightly change depending on the tuned state of the corresponding string and thus are changed intentionally by tuning in some cases.

Thus, in an embodiment, in order to enable simulation of such resonance characteristics as described above of an actual acoustic piano, for example, the key note, first resonance pitch, and second resonance pitch are given to each of the key numbers of the 88 keys, for example, as an individual piece in the key-based resonance pitch calculation table data exemplified in FIGS. 3 and 4. Control of production of a resonance tone in the embodiment is performed with reference to the key-based resonance pitch calculation table data. Thus, the embodiment enables reproduction of various characteristics of an actual acoustic piano.

That is, according to one embodiment, a musical tone corresponding to a first key having been pressed is generated by synthesizing a musical tone directly corresponding to the key number of the first key and respective resonance tones corresponding to the key numbers of a plurality of second keys each having a pitch in harmonic relationship with the pitch of the first key. Referring to FIGS. 3 and 4, the resonance tone to be generated corresponding to the key number of a second key is set to vary in tone depending on whether the second key is in the damped state or in the non-damped state. In one embodiment, when the second key is determined as being in the non-damped state, data of a first timbre is used, and when the second key is determined as being in the damped state, data of a second timbre is used. In another embodiment, when the second key is determined as being in the non-damped state, the resonance tone of the second key is generated with the first resonance pitch, and when the second key is determined as being in the damped state, the resonance tone of the second key is generated with the second resonance pitch, for example, higher than the first resonance pitch. Needless to say, any combination of the embodiments can be made.

Here, the damped state of the second key corresponds to a case where the second key has not been pressed and the damper pedal has not been depressed. The non-damped state of the second key corresponds to either a case where the second key has been pressed or a case where the damper pedal has been depressed.

Note that tuned pitches are registered in the key note of the key-based resonance pitch calculation table exemplified in FIGS. 3 and 4, and at the time of pressing of a key in the keyboard 104 in FIG. 1, a key-pressing tone is determined with reference to the key note, so that the key-pressing tone based on tuning information can be specified.

FIG. 5A illustrates an exemplary configuration of pitch-difference-based resonance strength table data. In the pitch-difference-based resonance strength table, with the pitch of a pressed key as a relative value of 0, set are relative pitch differences, on a chromatic-scale basis, each corresponding to the harmonic relationship between a resonance tone producible to the key-pressing tone of the key and the key-pressing tone, and the respective resonance strength ratios of the resonance tones at the pitch differences (in the harmonic relationships). For example, in response to power-on of the electronic keyboard instrument 100, the pitch-difference-based resonance strength table data is loaded from the ROM 102 to the RAM 103 in FIG. 1. Note that each resonance strength ratio may be changed by a user in setting. The section "supplementary (harmonics)" in FIG. 5A is provided as a display for easy understanding of the relationship between pitch difference and harmonics, and thus is not included in the pitch-difference-based resonance strength table data.

That is, according to one embodiment exemplified in FIG. 5A, in a case where the pitch of the second key is twice the pitch of the pressed first key in harmonic relationship, the resonance tone corresponding to the key number of the second key is synthesized, at a strength the same as (one time) that of the first key, with the musical tone directly corresponding to the key number of the first key. In a case where the pitch of the second key is three times the pitch of the pressed first key in harmonic relationship, the resonance tone corresponding to the key number of the second key is synthesized, at a strength lower than (0.8 times) the strength when the pitch of the second key is twice the pitch of the pressed first key in harmonic relationship, with the musical tone directly corresponding to the key number of the first key. Furthermore, in a case where the pitch of the second key is five times the pitch of the first key in harmonic relationship, the resonance tone corresponding to the key number of the second key is synthesized, at a strength further lower than (0.6 times) the strength when the pitch of the second key is three times the pitch of the pressed first key in harmonic relationship, with the musical tone directly corresponding to the key number of the first key.

FIG. 5B illustrates an exemplary configuration of key-pressing-compatible resonance-pitch candidate table data. In the key-pressing-compatible resonance-pitch candidate table data, with the pitch of a pressed key as a relative value of 0, stored are pitch differences, on both of the minus and plus sides based on the key-pressing pitch, each corresponding to a resonance tone producible with a pitch for the corresponding pitch difference (corresponding harmonic relationship) set in the pitch-difference-based resonance strength table data exemplified in FIG. 5A, resonance pitch candidates each as a pitch candidate for the pitch difference of the corresponding resonance tone to the actual pitch value of the key-pressing pitch, and resonance strength ratio candidates acquired from the pitch-difference-based resonance strength table data illustrated in FIG. 5A, corresponding one-to-one to the pitch differences. The CPU 101 creates, in the RAM 103, such key-pressing-compatible resonance-pitch candidate table data every time key pressing is detected in performing keyboard processing to be described below.

FIG. 5C illustrates each exemplary configuration of producible resonance-tone information table data. In the producible resonance-tone information table data, calculated is information regarding a resonance tone producible in practice from the resonance pitch candidates calculated as the key-pressing-compatible resonance-pitch candidate table data exemplified in FIG. 5B. Specifically, in the producible resonance-tone information table data, stored are a producible resonance key note as a key note producible in practice as a resonance tone due to the string of any of the 88 keys in the keyboard unit 104 in FIG. 1 from the resonance pitch candidates calculated as the key-pressing-compatible resonance-pitch candidate table data exemplified in FIG. 5B, a producible resonance timbre as the timbre of the resonance tone, a producible resonance pitch as the pitch of the resonance tone, and a producible resonance strength indicating the resonance strength (velocity) at the time of production of the resonance tone. Every time key pressing is detected in performing keyboard processing, the CPU 101 creates, in the RAM 103, such key-pressing-compatible resonance-pitch candidate table data as exemplified in FIG. 5B, and then searches each entry in the key-pressing-compatible resonance-pitch candidate table data, for whether or not the resonance pitch candidate of the entry has been registered as the first resonance pitch or the second resonance pitch in the key-based resonance pitch calculation table data exemplified in FIGS. 3 and 4. In this case, the CPU 101 searches the key-based resonance pitch calculation table data for the first resonance pitch in a case where the corresponding key note is determined as being in the non-damped state and for the second resonance pitch in a case where the corresponding key note is determined as being in the damped state. Then, when the first resonance pitch is searched for regarding one resonance pitch candidate, for a new entry to the producible resonance-tone information table data exemplified in FIG. 5C, the CPU 101 registers, as the producible resonance key note, the key note corresponding to the first resonance pitch searched for, registers, as the producible resonance timbre, a resonance timbre for a free string (hereinafter, referred to as a "free-string resonance timbre) that is the first timbre, registers, as the producible resonance pitch, the first resonance pitch searched for, and registers, as the producible resonance strength indicating the value of the velocity of the resonance tone to be produced, a value obtained by multiplying the velocity of the detected key pressing by the resonance strength ratio candidate registered in the key-pressing-compatible resonance-pitch candidate table data exemplified in FIG. 5B, corresponding to the resonance pitch candidate. Meanwhile, when the second resonance pitch is searched for regarding one resonance pitch candidate, for a new entry to the producible resonance-tone information table data exemplified in FIG. 5C, the CPU 101 registers, as the producible resonance key note, the key note corresponding to the second resonance pitch searched for, registers, as the producible resonance timbre, a resonance timbre for a non-free string (hereinafter, referred to as a "non-free-string resonance timbre) that is the second timbre, registers, as the producible resonance pitch, the second resonance pitch searched for, and registers, as the producible resonance strength indicating the value of the velocity of the resonance tone to be produced, a value obtained by multiplying the velocity of the detected key pressing by the resonance strength ratio candidate registered in the key-pressing-compatible resonance-pitch candidate table data exemplified in FIG. 5B, corresponding to the resonance pitch candidate.

Here, when the damper pedal included in the switch unit 105 in FIG. 1 is turned on, the CPU 101 determines that all the key notes of the 88 keys are in the non-damped state. The CPU 101 determines that a key note to which key pressing has occurred in the keyboard unit 104 is in the non-damped state. Furthermore, as exemplified with key numbers 54 to 88 in FIG. 4, in the key-based resonance pitch calculation table data, the CPU 101 determines that the key notes, which are set with no second resonance pitch registered such that no specification of the damped state is allowed or no resonance occurs, are in the non-damped state. Meanwhile, in a case where the damper pedal is off, the CPU 101 determines that the key notes, to which no key pressing has occurred in the keyboard unit 104, are in the damped state except the key notes, which are set with no second resonance pitch registered such that no specification of the damped state is allowed or no resonance occurs. Based on the non-damped state or the damped state, the CPU 101 controls tone production at the time of pressing of each key, enabling simulation of the behavior of the damper pedal in an actual acoustic piano or the like.

Simultaneously with a key-pressing tone produced due to key pressing, the CPU 101 creates a note-on event for instructing that the resonance tone corresponding to each entry registered in the producible resonance-tone information table data in FIG. 5C be produced, leading to instruction to the sound source LSI 106 in FIG. 1.

In an embodiment of the electronic musical instrument 100, the CPU 101 executes the control program having functions achievable, for example, in the flowcharts of FIGS. 6 to 12 in the following description, leading to achievement of control of the electronic keyboard instrument 100. For example, the control program may be distributed after being recorded on a transportable recording medium not particularly illustrated or may be acquired from a network through a communication interface not particularly illustrated such that the control program can be stored in the ROM 102.

Figure 6:
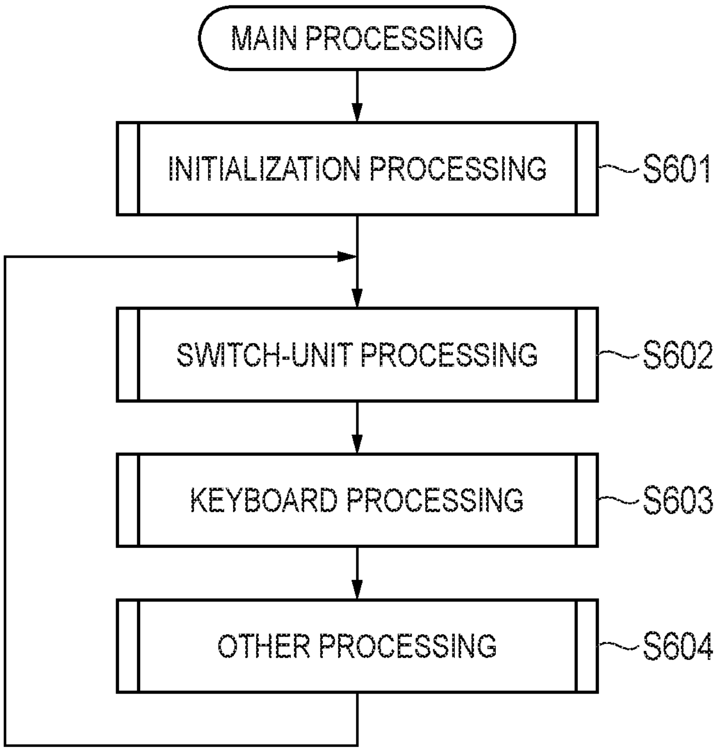
FIG. 6 is a flowchart of a processing example of main processing.

FIG. 6 is a flowchart of a processing example of main processing achievable due to an operation in which the CPU 101 in FIG. 1 loads, into the RAM 103, the control program stored in the ROM 102 and executes the control program. When a power switch not particularly illustrated in the switch unit 105 in FIG. 1 is turned on, the CPU 101 starts the main processing exemplified with the flowchart of FIG. 6.

The CPU 101 first performs initialization processing to initialize a group of variables in the RAM 103. The CPU 101 loads, from the ROM 102 to the RAM 103, the key-based resonance pitch calculation table data exemplified in FIGS. 3 and 4 and the pitch-difference-based resonance strength table data illustrated in FIG. 5A (step S601). After that, the CPU 101 is allowed to randomly access each piece of table data on the RAM 103.

Next, the CPU 101 repeatedly performs switch-unit processing in step S602, keyboard processing in step S603, and other processing in step S604.

In the switch-unit processing in step S602, the CPU 101 detects each operation status of the switch unit 105 in FIG. 1 and then sets the information thereon to the corresponding variable in the RAM 103. In particular, when the damper pedal in the switch unit 105 is operated, the CPU 101 stores, as the damper-pedal variable, the state of on or off of the damper pedal into the RAM 103.

The keyboard processing in step S603 will be described below.

In the other processing in step S604, the CPU 101 performs processing regarding control of the electronic keyboard instrument 100, excluding the switch-unit processing in step S602 and the keyboard processing in step S603.

Figure 7:
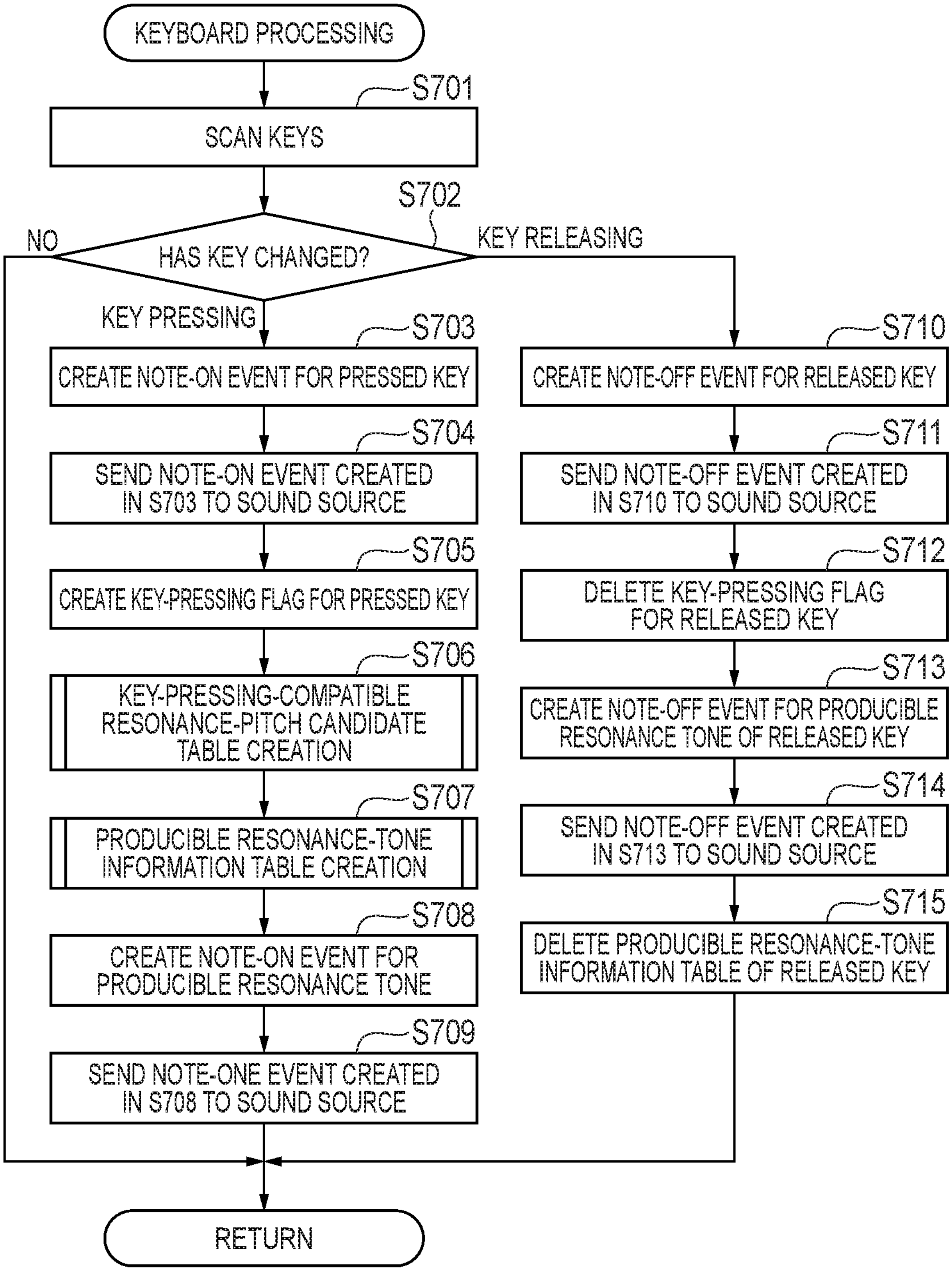
FIG. 7 is a flowchart of a detailed example of keyboard processing.

FIG. 7 is a flowchart of a detailed example of the keyboard processing in step S603 of FIG. 6. First, the CPU 101 scans each key on the keyboard 104 in FIG. 1 (step S701).

Next, the CPU 101 determines whether or not a change is made in the state of a key regarding key pressing (step S702).

If no change is made in the state of a key regarding key pressing, the CPU 101 directly terminates the keyboard processing in step S603 of FIG. 6 exemplified with the flowchart of FIG. 7.

In a case where key pressing is detected in step S702, the CPU 101 creates a note-on event, based on the key-pressing pitch and velocity determined as the key note corresponding to the key number of the key on the keyboard 104 at the time of key pressing (refer to the key-based resonance pitch calculation table data in FIG. 3 or 4) (step S703), and sends the note-on event to the sound source LSI 106 in FIG. 1 (step S704). When receiving the note-on event, the sound source LSI 106 allocates one tone-production channel (CHi) ($1 \leq i \leq 256$) corresponding to any of the waveform generation devices 210 (#1 to #256) in the waveform generator 201 exemplified in FIG. 2. With the tone-production channel (CHi), for example, based on time sharing, the waveform generation device 210 having received the allocation reads, from the waveform ROM not particularly illustrated, the waveform data of the timbre specified in advance by the switch unit 105 at the waveform reading rate corresponding to the key note. Inside the mixer 204, the waveform data is amplified by the velocity specified by the note-on event, leading to generation of musical-tone waveform data.

Next, the CPU 101 creates, in the RAM 103, a key-pressing flag indicating that the key note, to which the key pressing has occurred, has been pressed (step S705).

Next, the CPU 101 performs key-pressing-compatible resonance-pitch candidate table creation processing (step S706). Here, the CPU 101 performs processing of creating, on the RAM 103, key-pressing-compatible resonance-pitch candidate table data as exemplified in FIG. 5B described above. The processing will be described in detail below with the flowchart exemplified in FIG. 8.

Next, the CPU 101 performs producible resonance-tone information table creation processing (step S707). Here, the CPU 101 performs processing of creating, on the RAM 103, producible resonance-tone information table data as exemplified in FIG. 5C described above. The processing will be described in detail below with the flowchart exemplified in FIG. 9.

After that, the CPU 101 creates a note-on event for each resonance tone calculated as an entry in the producible resonance-tone information table data created in step S707 (step S708) and sends the note-on event to the sound source LSI 106 in FIG. 1 (step S709). When receiving the note-on event for each resonance tone, the sound source LSI 106 allocates the tone-production channel (CHi) ($1 \leq i \leq 256$) of any of the waveform generation devices 210 (#1 to #256) in the waveform generator 201 exemplified in FIG. 2. Thus, the waveform data of each resonance tone is output from the corresponding waveform generation device 210 through the tone-production channel. The key-pressing tone generated with the tone-production channel of one of the waveform generation devices 210 based on step S704 and the resonance tones generated with the tone-production channels of one or more of the waveform generation devices 210 based on step S709 are output as musical-tone output data to the sound system 107 in FIG. 1 after mixed by the mixer 204 and given the corresponding amplitude envelope characteristics by the DSP 202. After that, the CPU 101 terminates the keyboard processing in step S603 of FIG. 6 exemplified with the flowchart of FIG. 7.

In a case where key releasing is detected in step S702, the CPU 101 creates a note-off event, based on the key note corresponding to the key number of the key on the keyboard 104 at the time of key releasing (step S710), and sends the note-off event to the sound source LSI 106 in FIG. 1 (step S711). When receiving the note-off event, the sound source LSI 106 performs tone-mute processing of stopping the output of the waveform data of the key-pressing tone from the waveform generation device 210 through the tone-production channel to which the key note in the note-off event is allocated.

Next, the CPU 101 deletes the key-pressing flag created in the RAM 103, corresponding to the key note to which the key releasing has occurred (step S712).

Next, based on the producible resonance pitch of each entry in the producible resonance-tone information table data, as exemplified in FIG. 5C, created in the RAM 103, corresponding to the key note to which the key releasing has occurred, the CPU 101 creates a note-off event for the corresponding resonance tone (step S713), and sends each note-off event to the sound source LSI 106 (step S714). When receiving each note-off event, the sound source LSI 106 performs tone-mute processing of stopping the output of the waveform data of the resonance tone from the waveform generation device 210 through the tone-production channel to which the producible resonance pitch in the note-off event is allocated.

Finally, the CPU 101 deletes, from the RAM 103, the producible resonance-tone information table data, as exemplified in FIG. 5C, created in the RAM 103, corresponding to the key note to which the key releasing has occurred (step S715). After that, the CPU 101 terminates the keyboard processing in step S603 of FIG. 6 exemplified with the flowchart of FIG. 7.

Figure 8:
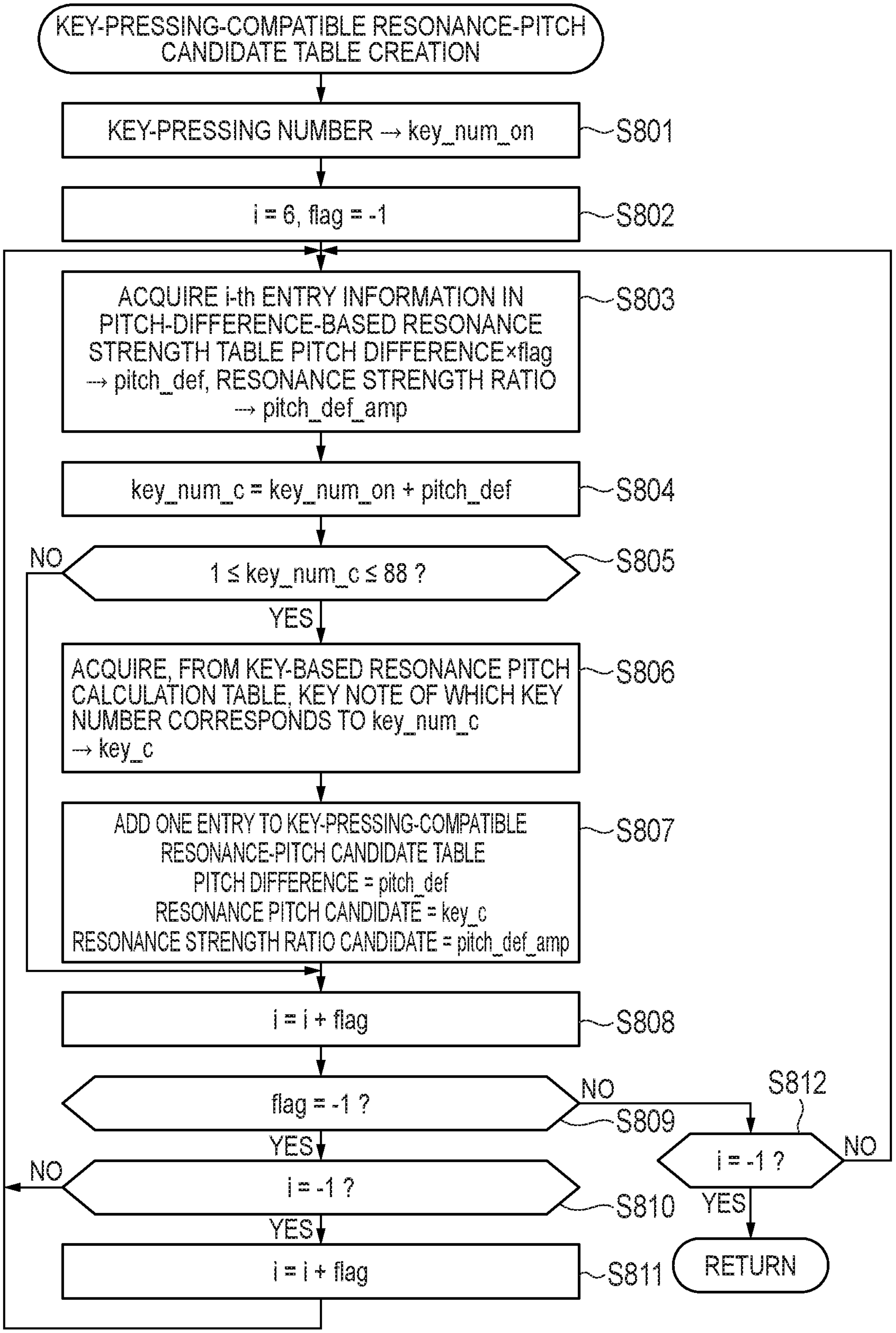
FIG. 8 is a flowchart of a detailed example of key-pressing-compatible resonance-pitch candidate table creation processing.

FIG. 8 is a flowchart of a detailed example of the key-pressing-compatible resonance-pitch candidate table creation processing to be performed in step S706 of FIG. 7. First, the CPU 101 stores, in the variable key_num_on on the RAM 103, the key number (key-pressing number) of the key-pressing tone acquired in step S701 of FIG. 7 (step S801). Note that, in the following description, a variable name is expressed as a variable value in some cases. For example, the value stored in the variable key_num_on is expressed as "the variable value key_num_on" in some cases.

Next, for processing from the largest pitch difference on the minus side based on the key-pressing pitch to the key-pressing pitch, the CPU 101 sets the value 6 to the variable i on the RAM 103 (corresponding to No.=6 in the pitch-difference-based resonance strength table data exemplified in FIG. 5A), and sets the value −1 indicating descending order (order in which No. decreases from the value 6 to the value 0 in the pitch-difference-based resonance strength table data exemplified in FIG. 5A), to the variable flag indicating processing order, on the RAM 103 (step S802).

After that, while repeatedly adding the value of the variable flag to the value of the variable i, namely, repeatedly subtracting, from the value of the variable i, the value 1 because the value of the variable flag is −1, the CPU 101 repeatedly performs a flow of processing from step S803 to step S807 below until the value of the variable i is determined as having reached the value −1 from the value 6 due to sequential decrement (step S810) after the determination in step S809 results in YES.

In a flow of processing from step S803 to step S807, the CPU 101 first acquires the i-th entry information indicated by the variable i in the pitch-difference-based resonance strength table data exemplified in FIG. 5A (step S803). As a result, the CPU 101 sets, to the variable pitch_def on the RAM 103, the minus value of the pitch difference obtained by multiplying the pitch difference acquired from the i-th entry by the value −1 of the variable flag, and sets, to the variable pitch_def_amp on the RAM 103, the value of the resonance strength ratio obtained in a similar manner.

Next, the CPU 101 adds, to the key-pressing number value key_num_on set as a variable on the RAM 103 in step S801, the pitch difference value pich_def set as a variable on the RAM 103 in step S803, calculates, as a result of the addition, the pitch positioned away by the current pitch difference from the key-pressing pitch, and stores the value thereof in the variable key_num_c on the RAM 103 (step S804).

Next, the CPU 101 determines whether or not the variable value key_num_c is in the range of number 1 to number 88 corresponding to the 88 keys (step S805).

In a case where the determination in step S805 results in NO, the pitch is not produced as a resonance tone because the pitch is out of the range of the 88 keys. Thus, the CPU 101 proceeds to step S808 and updates the variable value i.

In a case where the determination in step S805 results in YES, the pitch can be a resonance tone candidate. Thus, the CPU 101 first acquires, from the key-based resonance pitch calculation table data exemplified in FIG. 3 or 4, the key note of the entry of which the key number corresponds to the key number value key_num_c of the resonance tone candidate calculated in step S804 and sets the key note to the variable key_c on the RAM 103 (step S806).

Then, the CPU 101 adds one entry to the key-pressing-compatible resonance-pitch candidate table data exemplified in FIG. 5B to register the pitch difference=the variable value pitch_def, the resonance pitch candidate=variable value key_c, and the resonance strength ratio candidate=the variable value pitch_def_amp.

After that, the CPU 101 proceeds to step S808 and updates the variable value i.

Such a flow of processing from step S803 to step S807 as above enables creation of each entry in the key-pressing-compatible resonance-pitch candidate table data exemplified in FIG. 5B. Now, for example, if the key note of the key-pressing tone is C3, in step S801, number 28 is acquired as the key-pressing number of the key note C3 from the key-based resonance pitch calculation table data exemplified in FIG. 3, so that key_num_on=28 is set. Then, in a case where the variable value i=6 and the variable value flag=−1 are defined, in step S803, based on the entry with No.=i=6 in the pitch-difference-based resonance strength table data exemplified in FIG. 5A, a computation is made for the variable value pitch_def=the pitch difference 36×the variable value flag=−36, so that the variable value pitch_def_amp=0.2 is obtained. Next, in step S804, a calculation is made for the variable value key_num_c=the variable value key_num_on+the variable value pich_def=28−36=−8. As a result, the determination in step S805 results in NO, and thus no entry is created to the key-pressing-compatible resonance-pitch candidate table. In response to i=6−1=5 due to a transition to step S808 and, the determination in step S809 results in YES and the determination in step S810 results in NO, leading to a return to the processing in step S803.

In the following step S803, based on the entry with No.=i=5 in the pitch-difference-based resonance strength table data exemplified in FIG. 5A, a computation is made for the variable value pitch_def=the pitch difference 31×the variable value flag=−31, so that the variable value pitch_def_amp=0.4 is obtained. Next, in step S804, a calculation is made for the variable value key_num_c=the variable value key_num_on+the variable value pich_def=28−31=−3. As a result, the determination in step S805 results in NO, and thus no entry is created to the key-pressing-compatible resonance-pitch candidate table. In response to i=5-1=4 due to a transition to step S808, the determination in step S809 results in YES and the determination in step S810 results in NO, leading to a return to the processing in step S803.

In the following step S803, based on the entry with No.=i=4 in the pitch-difference-based resonance strength table data exemplified in FIG. 5A, a computation is made for the variable value pitch_def=the pitch difference 28×the variable value flag=−28, so that the variable value pitch_def_amp=0.6 is obtained. Next, in step S804, a calculation is made for the variable value key_num_c=the variable value key_num_on+the variable value pich_def=28−28=0. As a result, the determination in step S805 results in NO, and thus no entry is created to the key-pressing-compatible resonance-pitch candidate table. In response to i=4−1=3 due to a transition to step S808, the determination in step S809 results in YES and the determination in step S810 results in NO, leading to a return to the processing in step S803.

In the following step S803, based on the entry with No.=i=3 in the pitch-difference-based resonance strength table data exemplified in FIG. 5A, a computation is made for the variable value pitch_def=the pitch difference 24×the variable value flag=−24, so that the variable value pitch_def_amp=0.8 is obtained. Next, in step S804, a calculation is made for the variable value key_num_c=the variable value key_num_on+the variable value pich_def=28−24=4. As a result, the determination in step S805 results in YES. In step S806, from the key-based resonance pitch calculation table data exemplified in FIG. 3, the key note=C1 of the entry of which the key number corresponds to the variable value key_num_c=4 is acquired to the variable key_c. Then, in step S807, with the pitch difference=pitch_def=−24, the resonance pitch candidate=key_c=C1, and the resonance strength ratio candidate=pitch_def_amp=0.8, the first-line entry is created in the key-pressing-compatible resonance-pitch candidate table data exemplified in FIG. 5B. After that, in response to i=3−1=2 due to a transition to step S808, the determination in step S809 results in YES and the determination in step S810 results in NO, leading to a return to the processing in step S803.

In the following step S803, based on the entry with No.=i=2 in the pitch-difference-based resonance strength table data exemplified in FIG. 5A, a computation is made for the variable value pitch_def=the pitch difference 19×the variable value flag=−19, so that the variable value pitch_def_amp=0.8 is obtained. Next, in step S804, a calculation is made for the variable value key_num_c=the variable value key_num_on+the variable value pich_def=28−19=9. As a result, the determination in step S805 results in YES. In step S806, from the key-based resonance pitch calculation table data exemplified in FIG. 3, the key note=F1 of the entry of which the key number corresponds to the variable value key_num_c=9 is acquired to the variable key_c. Then, in step S807, with the pitch difference=pitch_def=−19, the resonance pitch candidate=key_c=F1, and the resonance strength ratio candidate=pitch_def_amp=0.8, the second-line entry is created in the key-pressing-compatible resonance-pitch candidate table data exemplified in FIG. 5B. After that, in response to i=2−1=1 due to a transition to step S808, the determination in step S809 results in YES and the determination in step S810 results in NO, leading to a return to the processing in step S803.

In the following step S803, based on the entry with No.=i=1 in the pitch-difference-based resonance strength table data exemplified in FIG. 5A, a computation is made for the variable value pitch_def=the pitch difference 12×the variable value flag=−12, so that the variable value pitch_def_amp=1 is obtained. Next, in step S804, a calculation is made for the variable value key_num_c=the variable value key_num_on+the variable value pich_def=28−12=16. As a result, the determination in step S805 results in YES. In step S806, from the key-based resonance pitch calculation table data exemplified in FIG. 3, the key note=C2 of the entry of which the key number corresponds to the variable value key_num_c=16 is acquired to the variable key_c. Then, in step S807, with the pitch difference=pitch_def=−12, the resonance pitch candidate=key_c=C2, and the resonance strength ratio candidate=pitch_def_amp=1, the third-line entry is created in the key-pressing-compatible resonance-pitch candidate table data exemplified in FIG. 5B. After that, in response to i=1−1=0 due to a transition to step S808, the determination in step S809 results in YES and the determination in step S810 results in NO, leading to a return to the processing in step S803.

In the following step S803, based on the entry with No.=i=0 in the pitch-difference-based resonance strength table data exemplified in FIG. 5A, a computation is made for the variable value pitch_def=the pitch difference 0×the variable value flag=+0, so that the variable value pitch_def_amp=1 is obtained. Next, in step S804, a calculation is made for the variable value key_num_c=the variable value key_num_on+the variable value pich_def=28−0=28. As a result, the determination in step S805 results in YES. In step S806, from the key-based resonance pitch calculation table data exemplified in FIG. 3, the key note=C3 of the entry of which the key number corresponds to the variable value key_num_c=28 is acquired to the variable key_c. Then, in step S807, with the pitch difference=pitch_def=+0, the resonance pitch candidate=key_c=C3, and the resonance strength ratio candidate=pitch_def_amp=1, the fourth-line entry is created in the key-pressing-compatible resonance-pitch candidate table data exemplified in FIG. 5B. After that, a transition to step S808 causes i=0-1=−1. Here, the determination in step S809 results in YES and the determination in step S810 results in YES.

In this manner, the variable value i varies from the value 6 to the value 0 and the entries corresponding to resonance tone candidates of which the pitch difference is on the minus side and the entry corresponding to the key-pressing tone (entries of the first four lines with the pitch difference ranging from −24 to +0) are created as the key-pressing-compatible resonance-pitch candidate table data exemplified in FIG. 5B. Subsequently, for processing from the pitch of which the pitch difference is closest to the key-pressing pitch to the pitch of which the pitch difference is farthest from the key-pressing pitch on the plus side based on the key-pressing pitch, the CPU 101 sets the value 1 to the variable i on the RAM 103 (corresponding to No.=1 in the pitch-difference-based resonance strength table data exemplified in FIG. 5A), and sets the value 1 indicating ascending order (order in which No. increases from the value 1 to the value 6 in the pitch-difference-based resonance strength table data exemplified in FIG. 5A), to the variable flag indicating processing order, on the RAM 103 (step S811).

After that, while repeatedly adding the value of the variable flag to the value of the variable i, namely, repeatedly adding the value 1 to the value of the variable i because the value of the variable flag is 1, similarly as described above, the CPU 101 repeatedly performs a flow of processing from step S803 to step S807 until the value of the variable i is determined as having reached the value 7 from the value 1 due to sequential increment (step S812) after the determination in step S809 results in NO.

Specifically, first, after the variable value i=1 and the variable value flag=1 are set in step S811, a return is made to the processing in step S803. In step S803, based on the entry with No.=i=1 in the pitch-difference-based resonance strength table data exemplified in FIG. 5A, a computation is made for the variable value pitch_def=the pitch difference 12×the variable value flag=+12, so that the variable value pitch_def_amp=1 is obtained. Next, in step S804, a calculation is made for the variable value key_num_c=the variable value key_num_on+the variable value pich_def=28+12=40. As a result, the determination in step S805 results in YES. In step S806, from the key-in FIG. 3, the key note=C4 of the entry of which the key number corresponds to the variable value key_num_c=40 is acquired to the variable key_c. Then, in step S807, with the pitch difference=pitch_def=+12, the resonance pitch candidate=key_c=C4, and the resonance strength ratio candidate=pitch_def_amp=1, the fifth-line entry is created in the key-pressing-compatible resonance-pitch candidate table data exemplified in FIG. 5B. After that, in response to i=1+1=2 due to a transition to step S808, the determination in step S809 results in NO and the determination in step S812 results in NO, leading to a return to the processing in step S803.

In the following step S803, based on the entry with No.=i=2 in the pitch-difference-based resonance strength table data exemplified in FIG. 5A, a computation is made for the variable value pitch_def=the pitch difference 19×the variable value flag=+19, so that the variable value pitch_def_amp=0.8 is obtained. Next, in step S804, a calculation is made for the variable value key_num_c=the variable value key_num_on+the variable value pich_def=28+19=47. As a result, the determination in step S805 results in YES. In step S806, from the key-based resonance pitch calculation table data exemplified in FIG. 4, the key note=G4 of the entry of which the key number corresponds to the variable value key_num_c=47 is acquired to the variable key_c. Then, in step S807, with the pitch difference=pitch_def=+19, the resonance pitch candidate=key_c=G4, and the resonance strength ratio candidate=pitch_def_amp=0.8, the sixth-line entry is created in the key-pressing-compatible resonance-pitch candidate table data exemplified in FIG. 5B. After that, in response to i=2+1=3 due to a transition to step S808, the determination in step S809 results in NO and the determination in step S812 results in NO, leading to a return to the processing in step S803.

In the following step S803, based on the entry with No.=i=3 in the pitch-difference-based resonance strength table data exemplified in FIG. 5A, a computation is made for the variable value pitch_def=the pitch difference 24×the variable value flag=+24, so that the variable value pitch_def_amp=0.8 is obtained. Next, in step S804, a calculation is made for the variable value key_num_c=the variable value key_num_on+the variable value pich_def=28+24=52. As a result, the determination in step S805 results in YES. In step S806, from the key-based resonance pitch calculation table data exemplified in FIG. 4, the key note=C5 of the entry of which the key number corresponds to the variable value key_num_c=52 is acquired to the variable key_c. Then, in step S807, with the pitch difference=pitch_def=+24, the resonance pitch candidate=key_c=C5, and the resonance strength ratio candidate=pitch_def_amp=0.8, the seventh-line entry is created in the key-pressing-compatible resonance-pitch candidate table data exemplified in FIG. 5B. After that, in response to i=3+1=4 due to a transition to step S808, the determination in step S809 results in NO and the determination in step S812 results in NO, leading to a return to the processing in step S803.

In the following step S803, based on the entry with No.=i=4 in the pitch-difference-based resonance strength table data exemplified in FIG. 5A, a computation is made for the variable value pitch_def=the pitch difference 28×the variable value flag=+28, so that the variable value pitch_def_amp=0.6 is obtained. Next, in step S804, a calculation is made for the variable value key_num_c=the variable value key_num_on+the variable value pich_def=28+28=56. As a result, the determination in step S805 results in YES. In step S806, from the key-based resonance pitch calculation table data in FIG. 4, the key note=E5 of the entry of which the key number corresponds to the variable value key_num_c=56 is acquired to the variable key_c. Then, in step S807, with the pitch difference=pitch_def=+28, the resonance pitch candidate=key_c=E5, and the resonance strength ratio candidate=pitch_def_amp=0.6, the eighth-line entry is created in the key-pressing-compatible resonance-pitch candidate table data exemplified in FIG. 5B. After that, in response to i=4+1=5 due to a transition to step S808, the determination in step S809 results in NO and the determination in step S812 results in NO, leading to a return to the processing in step S803.

In the following step S803, based on the entry with No.=i=5 in the pitch-difference-based resonance strength table data exemplified in FIG. 5A, a computation is made for the variable value pitch_def=the pitch difference 31×the variable value flag=+31, so that the variable value pitch_def_amp=0.4 is obtained. Next, in step S804, a calculation is made for the variable value key_num_c=the variable value key_num_on+the variable value pich_def=28+31=59. As a result, the determination in step S805 results in YES. In step S806, from the key-based resonance pitch calculation table data in FIG. 4, the key note=G5 of the entry of which the key number corresponds to the variable value key_num_c=59 is acquired to the variable key_c. Then, in step S807, with the pitch difference=pitch_def=+31, the resonance pitch candidate=key_c=G5, and the resonance strength ratio candidate=pitch_def_amp=0.4, the ninth-line entry is created in the key-pressing-compatible resonance-pitch candidate table data exemplified in FIG. 5B. After that, in response to i=5+1=6 due to a transition to step S808, the determination in step S809 results in NO and the determination in step S812 results in NO, leading to a return to the processing in step S803.

Finally, in step S803, based on the entry with No.=i=6 in the pitch-difference-based resonance strength table data exemplified in FIG. 5A, a computation is made for the variable value pitch_def=the pitch difference 36×the variable value flag=+36, so that the variable value pitch_def_amp=0.2 is obtained. Next, in step S804, a calculation is made for the variable value key_num_c=the variable value key_num_on+the variable value pich_def=28+36=64. As a result, the determination in step S805 results in YES. In step S806, from the key-based resonance pitch calculation table data in FIG. 4, the key note=C6 of the entry of which the key number corresponds to the variable value key_num_c=64 is acquired to the variable key_c. Then, in step S807, with the pitch difference=pitch_def=+36, the resonance pitch candidate=key_c=C6, and the resonance strength ratio candidate=pitch_def_amp=0.2, the last-line entry is created in the key-pressing-compatible resonance-pitch candidate table data exemplified in FIG. 5B. After that, in response to i=6+1=7 due to a transition to step S808, the determination in step S809 results in NO and then the determination in step S812 results in YES, leading to termination of the entire processing.

As above, the key-pressing-compatible resonance-pitch candidate table data exemplified in FIG. 5B is created on the RAM 103. After that, the CPU 101 terminates the key-pressing-compatible resonance-pitch candidate table creation processing in step S706 of FIG. 7 exemplified with the flowchart of FIG. 8.

Figure 9:
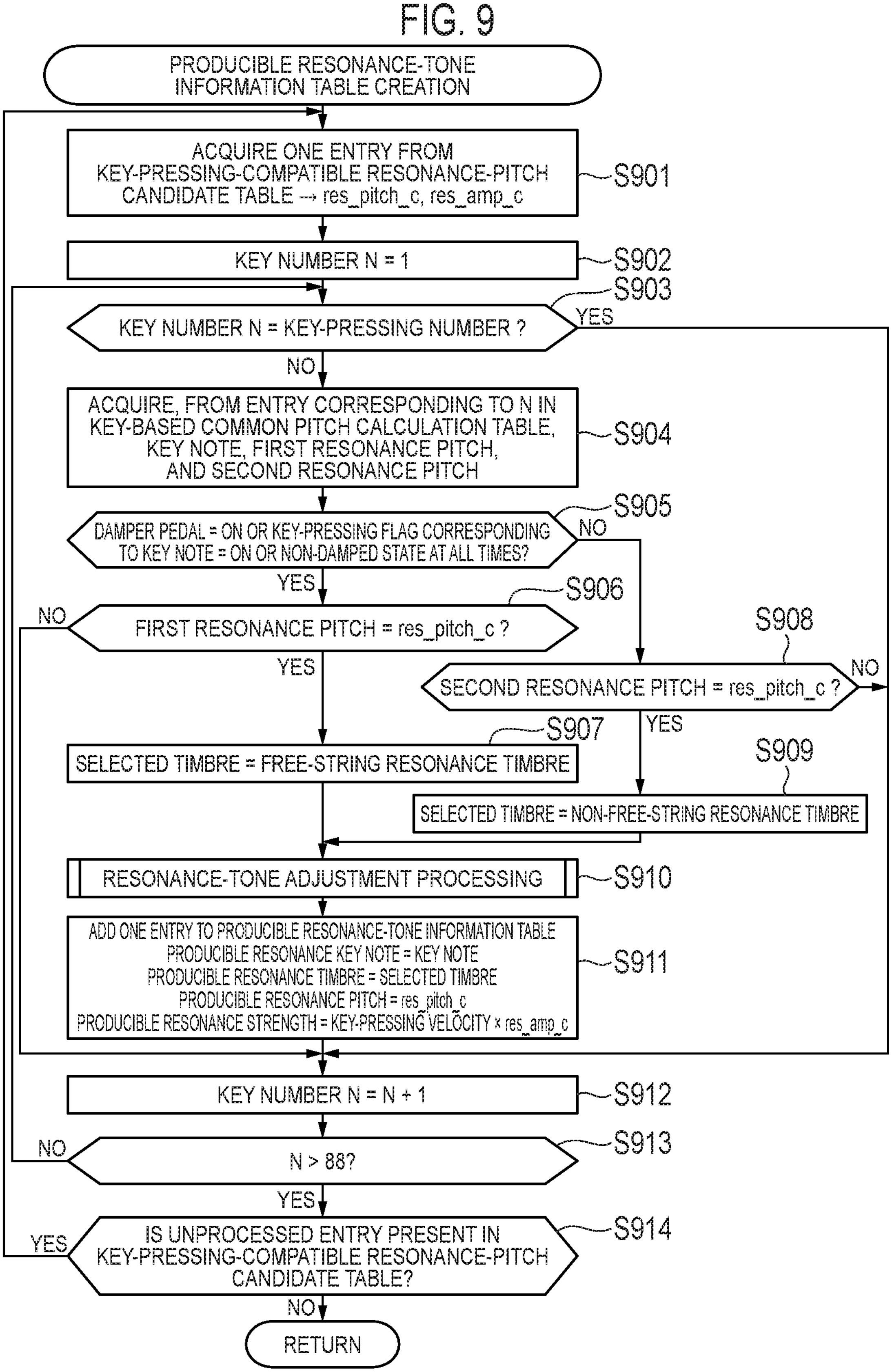
FIG. 9 is a flowchart of a detailed example of producible resonance-tone information table creation processing.

FIG. 9 is a flowchart of a detailed example of the producible resonance-tone information table creation processing to be performed in step S707 of FIG. 7. First, the CPU 101 acquires information on one entry in the order from top of the key-pressing-compatible resonance-pitch candidate table data exemplified in FIG. 5B, stores, in the variable res_pitch_c on the RAM 103, the value of the resonance pitch candidate acquired from the entry, and stores, in the variable res_amp_c on the RAM 103, the value of the resonance strength ratio candidate acquired from the entry (step S901).

Next, the CPU 101 sets the value 1 to the variable N specifying key number on the RAM 103 (step S902).

After that, the CPU 101 repeatedly performs a flow of processing from step S903 to step S911 while incrementing the value of the variable N by +1 (step S912), until the value is determined as larger than the value 88 corresponding to the 88 keys (step S913).

In a flow of processing from step S903 to step S911, the CPU 101 first determines whether or not the key-number variable value N is identical to the key-pressing number detected in step S701 of FIG. 7 (step S903). In a case where the determination in step S903 results in YES, the string of the pressed key is not regarded as a resonance string. Thus, without creating an entry to the producible resonance-tone information table, the CPU 101 proceeds to step S912 and increments the value of the key-number variable value N by 1.

In a case where the determination in step S903 results in NO, the CPU 101 acquires the key note, the first resonance pitch, and the second resonance pitch from the entry with the key number indicated by the variable value N in the key-based resonance pitch calculation table data exemplified in FIGS. 3 and 4 (step S904).

Next, the CPU 101 determines whether or not the value of the damper-pedal variable set in the RAM 103 by the switch-unit processing in step S602 of FIG. 6 indicates on, namely, whether or not the damper pedal is on, and determines whether or not a key-pressing flag has been created in the RAM 103, corresponding to the key note acquired in step S904 and the key note is in the non-damped state due to the key pressing (refer to step S705 of FIG. 7) or is at all times in the non-damped state with the first resonance pitch having a value and the second resonance pitch having no value, acquired in the step S904 (any of the entries with key numbers 69 to 88 in FIG. 4) (step S905).

In a case where the determination in step S905 results in YES, the CPU 101 determines whether or not the first resonance pitch acquired in step S904 is identical to the variable value res_pitch_c (value of the resonance pitch candidate) acquired in step S901 (step S906).

In a case where the determination in step S906 results in NO, without creating an entry to the producible resonance-tone information table, the CPU 101 proceeds to step S912 and increments the value of the key-number variable value N by 1.

In a case where the determination in step S906 results in YES, the CPU 101 sets, at the "free-string resonance timbre" (timbre in the non-damped state), the value of the selected timbre as a variable on the RAM 103 (step S907).

Meanwhile, in a case where the determination in step S905 described above results in NO, the CPU 101 determines whether or not the second resonance pitch acquired in step S904 is identical to the variable value res_pitch_c (resonance pitch candidate) acquired in step S901 (step S908).

In a case where the determination in step S908 results in NO, without creating an entry to the producible resonance-tone information table, the CPU 101 proceeds to step S912 and increments the value of the key-number variable value N by 1.

In a case where the determination in step S908 results in YES, the CPU 101 sets, at the "non-free-string resonance timbre" (timbre in the damped state), the value of the selected timbre as a variable on the RAM 103 (step S909).

After the processing in step S907 or S909 described above, the CPU 101 performs resonance-tone adjustment processing to be described below to determine whether or not a resonance tone should be produced with the current resonance pitch candidate, based on relationship with another resonance tone, with the same pitch, having already been produced (step S910).

As a result of the resonance-tone adjustment processing in step S910, in a case where a resonance tone is determined to be produced with the current resonance pitch candidate, the CPU 101 adds one entry to the producible resonance-tone information table data exemplified in FIG. 5C to register the producible resonance key note=the key note acquired in step S904, the producible resonance timbre=the selected timbre set as a variable on the RAM 103 in step S907 or S909, the producible resonance pitch=the resonance-pitch candidate variable value res_pitch_c acquired in step S901, and the producible resonance strength=the key-pressing velocity acquired in step S701 of FIG. 7×the resonance-strength-ratio variable value res_amp_c acquired in step S901. That is, the resonance tone to be produced is produced at the velocity (producible resonance strength) reduced by the proportion of the resonance strength ratio candidate to the velocity of the key-pressing tone. The resonance strength ratio is defined in the pitch-difference-based resonance strength table exemplified in FIG. 5A, and a resonance tone higher in pitch than the key-pressing tone has a lower producible strength.

After that, the CPU 101 proceeds to step S912 and updates the value of the key-number variable value N.

After termination of a flow of processing from step S902 to step S913 regarding one (step S901) of the entries in the key-pressing-compatible resonance-pitch candidate table data exemplified in FIG. 5B, the CPU 101 determines whether or not an unprocessed entry is present in the key-pressing-compatible resonance-pitch candidate table data (step S914).

In a case where the determination in step S914 results in YES, the CPU 101 returns to the processing in step S901 and proceeds to perform the flow of processing described above to the next entry in the key-pressing-compatible resonance-pitch candidate table data.

When the determination in step S914 results in NO, the CPU 101 terminates the producible resonance-tone information table creation processing in step S707 of FIG. 7 exemplified with the flowchart of FIG. 9.

Such a flow of processing from step S904 to step S911 as above enables creation of each entry in the producible resonance-tone information table data exemplified in FIG. 5C. As a specific example, processing of creating the producible resonance-tone information table data exemplified in FIG. 5C from the key-pressing-compatible resonance-pitch candidate table data exemplified in FIG. 5B will be described. Now, it is defined that two keys corresponding to two key notes of C4 and G4 have already been pressed with the damper pedal off and then the key corresponding to a key note of C3 is further pressed. The key-pressing-compatible resonance-pitch candidate table data exemplified in FIG. 5B corresponds to data created when the key corresponding to the key note of C3 is pressed. Under this condition, only regarding key number 40 exemplified in FIG. 3 and key number 47 exemplified in FIG. 4, the key is in the non-damped state and the determination in step S905 results in YES, leading to determination of the first resonance pitch. Regarding the other key numbers, the key is in the damped state and the determination in step S905 results in NO, leading to determination of the second resonance pitch.

First, in step S901, information on the first-line entry in the key-pressing-compatible resonance-pitch candidate table data is acquired, and the variable value res_pitch_c=C1 and the variable value res_amp_c=0.8 are set.

Next, the CPU 101 sets the value 1 to the variable N specifying key number on the RAM 103 (step S902). After that, the CPU 101 repeatedly performs a flow of processing from step S903 to step S911 while incrementing the value of the variable N by +1 (step S912), until the value is determined as larger than the value 88 corresponding to the 88 keys (step S913). Thus, when the key number N is 40 or 47, in step S906 after the determination in step S905 results in YES, it is determined whether or not the resonance-pitch candidate value res_pitch_c=C1 acquired from the key-pressing-compatible resonance-pitch candidate table data exemplified in FIG. 5B is identical to the first resonance pitch with the key number N acquired from the key-based resonance pitch calculation table data exemplified in FIG. 3 or 4. When the key number N is not 40 or 47, in step S908 after the determination in step S905 results in NO, it is determined whether or not the resonance-pitch candidate value res_pitch_c=C1 acquired from the key-pressing-compatible resonance-pitch candidate table data exemplified in FIG. 5B is identical to the second resonance pitch with the key number N acquired from the key-based resonance pitch calculation table data exemplified in FIG. 3 or 4. As a result, the resonance-pitch candidate value res_pitch_c=C1 is not identical to the first resonance pitch and second resonance pitch with any key number on the key-based resonance pitch calculation table data exemplified in FIGS. 3 and 4. Thus, the resonance-pitch candidate value res_pitch_c=C1 is not registered as the producible resonance-tone information table data exemplified in FIG. 5C.

After that, in step S901 through step S914, regarding the second-line resonance-pitch candidate value res_pitch_c=F1 and the third-line resonance-pitch candidate value res_pitch_c=C2 in the key-pressing-compatible resonance-pitch candidate table data exemplified in FIG. 5B, similarly as above, a flow of processing from step S903 to step S911 is repeatedly performed with the key-number variable value N varying from 1 to 88. The resonance-pitch candidate value res_pitch_c=F1 or C2 is not identical to the first resonance pitch and second resonance pitch with any key number on the key-based resonance pitch calculation table data exemplified in FIGS. 3 and 4. Thus, the resonance-pitch candidate value res_pitch_c=F1 or C2 is not registered as the producible resonance-tone information table data exemplified in FIG. 5C.

After that, in step S901 through step S914, regarding the fourth-line resonance-pitch candidate value res_pitch_c=C3 in the key-pressing-compatible resonance-pitch candidate table data exemplified in FIG. 5B, similarly as above, a flow of processing from step S904 to step S911 is repeatedly performed with the key-number variable value N varying from 1 to 88. As a result, with the key number N=16, in step S908, the resonance-pitch candidate value res_pitch_c=C3 acquired from the key-pressing-compatible resonance-pitch candidate table data exemplified in FIG. 5B is identical to the second resonance pitch with key number 16 acquired from the key-based resonance pitch calculation table data exemplified in FIG. 3, so that the determination in step S908 results in YES. As a result, in step S911 through steps S909 and S910, the producible resonance key note=C2 (=the key note with key number 16 in the key-based resonance pitch calculation table data exemplified in FIG. 3), the producible resonance timbre=the "non-free-string resonance timbre", the producible resonance pitch=res_pitch_c=C3, and the producible resonance strength=the key-pressing velocity× the resonance-strength-ratio candidate value (=1) are registered as the first-line entry in the producible resonance-tone information table data exemplified in FIG. 5C.

After that, in step S901 through step S914, regarding the fifth-line resonance-pitch candidate value res_pitch_c=C4 in the key-pressing-compatible resonance-pitch candidate table data exemplified in FIG. 5B, similarly as above, a flow of processing from step S904 to step S911 is repeatedly performed with the key-number variable value N varying from 1 to 88. C4 has been registered as the second resonance pitch with key number 28 in the key-based resonance pitch calculation table data exemplified in FIG. 3 and the key number is identical to the key-pressing number. Thus, with key number N=28, the determination in step S903 results in YES, leading to no registration of an entry to the producible resonance-tone information table data exemplified in FIG. 5C (step S911). C4 has been registered as the first resonance pitch with key number 40 in the key-based resonance pitch calculation table data exemplified in FIG. 3 but the key is in the damped state. Thus, with key number N=40, the determination in step S905 results in NO, leading to no step S907 and no registration of an entry to the producible resonance-tone information table data exemplified in FIG. 5C (step S911). That is, since the resonance-pitch candidate value res_pitch_c=C4 is not identical to the first resonance pitch and second resonance pitch with any key number on the key-based resonance pitch calculation table data exemplified in FIGS. 3 and 4, the resonance-pitch candidate value res_pitch_c=C4 is not registered as the producible resonance-tone information table data exemplified in FIG. 5C.

After that, in step S901 through step S914, regarding the sixth-line resonance-pitch candidate value res_pitch_c=G4 in the key-pressing-compatible resonance-pitch candidate table data exemplified in FIG. 5B, similarly as above, a flow of processing from step S904 to step S911 is repeatedly performed with the key-number variable value N varying from 1 to 88. As a result, with the key number N=35, in step S908, it is determined that the resonance-pitch candidate value res_pitch_c=G4 acquired from the key-pressing-compatible resonance-pitch candidate table data exemplified in FIG. 5B is identical to the second resonance pitch with key number 35 acquired from the key-based resonance pitch calculation table data exemplified in FIG. 3, so that the determination in step S908 results in YES. As a result, in step S911 through steps S909 and $910, the producible resonance key note=G3 (=the key note with key number 35 in the key-based resonance pitch calculation table data exemplified in FIG. 3), the producible resonance timbre=the "non-free-string resonance timbre", the producible resonance pitch=res_pitch_c=G4, and the producible resonance strength=the key-pressing velocity×the resonance-strength-ratio candidate (=0.8) are registered as the second-line entry in the producible resonance-tone information table data exemplified in FIG. 5C. Furthermore, with the key number N=47, in step S906, it is determined that the resonance-pitch candidate value res_pitch_c=G4 acquired from the key-pressing-compatible resonance-pitch candidate table data exemplified in FIG. 5B is identical to the first resonance pitch with key number 47 acquired from the key-based resonance pitch calculation table data exemplified in FIG. 4, so that the determination in step S906 results in YES. As a result, in step S911 through steps S907 and S910, the producible resonance key note=G4 (=the key note with key number 47 in the key-based resonance pitch calculation table data exemplified in FIG. 4), the producible resonance timbre=the "free-string resonance timbre", the producible resonance pitch=res_pitch_c=G4, and the producible resonance strength=the key-pressing velocity×the resonance-strength-ratio candidate (=0.8) are registered as the third-line entry in the producible resonance-tone information table data exemplified in FIG. 5C. In this example, regarding the producible resonance pitch=G4, two resonance strings of the resonance string with key number 35 in the damped state and the resonance string with key number 47 in the non-damped state due to the key pressing in advance resonate together. Thus, pieces of waveform data of resonance tones are output from different waveform generation devices 210 with different tone-production channels in the sound source LSI 106.

In this case, based on two pieces of producible resonance-tone information, of which the producible resonance pitches are both G4, in the second and third lines in the producible resonance-tone information table data exemplified in FIG. 5C, in steps S708 and S709 of FIG. 7, two note-on events with different timbres, such as the "non-free-string resonance timbre" and the "free-string resonance timbre" as producible resonance timbres, are generated and transmitted to the sound source LSI 106. In this case, in the resonance-tone adjustment processing in step S910 to be described below, in order to suppress the number of tone-production channels to be used in the sound source LSI 106, only either resonance tone may be produced. However, resonance tones, of which the respective timbres are different, may be both produced with different tone-production channels (refer to step S1001 of FIG. 10 or 11). This enables production of an unusually expressive resonance tone although tone-production channels are used.

After that, in step S901 through step S914, regarding the seventh-line resonance-pitch candidate value res_pitch_c=C5 and the ninth-line resonance-pitch candidate value res_pitch_c=G5 in the key-pressing-compatible resonance-pitch candidate table data exemplified in FIG. 5B, similarly as above, a flow of processing from step S904 to step S911 is repeatedly performed with the key-number variable value N varying from 1 to 88. However, the resonance-pitch candidate value res_pitch_c=C5 or G5 is not identical to the first resonance pitch and second resonance pitch with any key number on the key-based resonance pitch calculation table data exemplified in FIGS. 3 and 4, and thus the resonance-pitch candidate value res_pitch_c=C5 or G5 is not registered as the producible resonance-tone information table data exemplified in FIG. 5C.

Meanwhile, in step S901 through step S914, regarding the eighth-line resonance-pitch candidate value res_pitch_c=E5 and the tenth-line resonance-pitch candidate value res_pitch_c=C6 in the key-pressing-compatible resonance-pitch candidate table data exemplified in FIG. 5B, similarly as above, a flow of processing from step S904 to step S911 is repeatedly performed with the key-number variable value N varying from 1 to 88. As a result, with the key number N=44, in step S908, it is determined that the resonance-pitch candidate value res_pitch_c=E5 acquired from the key-pressing-compatible resonance-pitch candidate table data exemplified in FIG. 5B is identical to the second resonance pitch with key number 44 acquired from the key-in FIG. 3, so that the determination in step S908 results in YES. In addition, with the key number N=52, in step S908, it is determined that the resonance-pitch candidate value res_pitch_c=C6 acquired from the key-pressing-compatible resonance-pitch candidate table data exemplified in FIG. 5B is identical to the second resonance pitch with key number 52 acquired from the key-based resonance pitch calculation table data exemplified in FIG. 4, so that the determination in step S908 results in YES. Based on these results, in step S911 through steps S909 and S910, the fourth-line and fifth-line entries in the producible resonance-tone information table data exemplified in FIG. 5C are registered.

Figure 10:
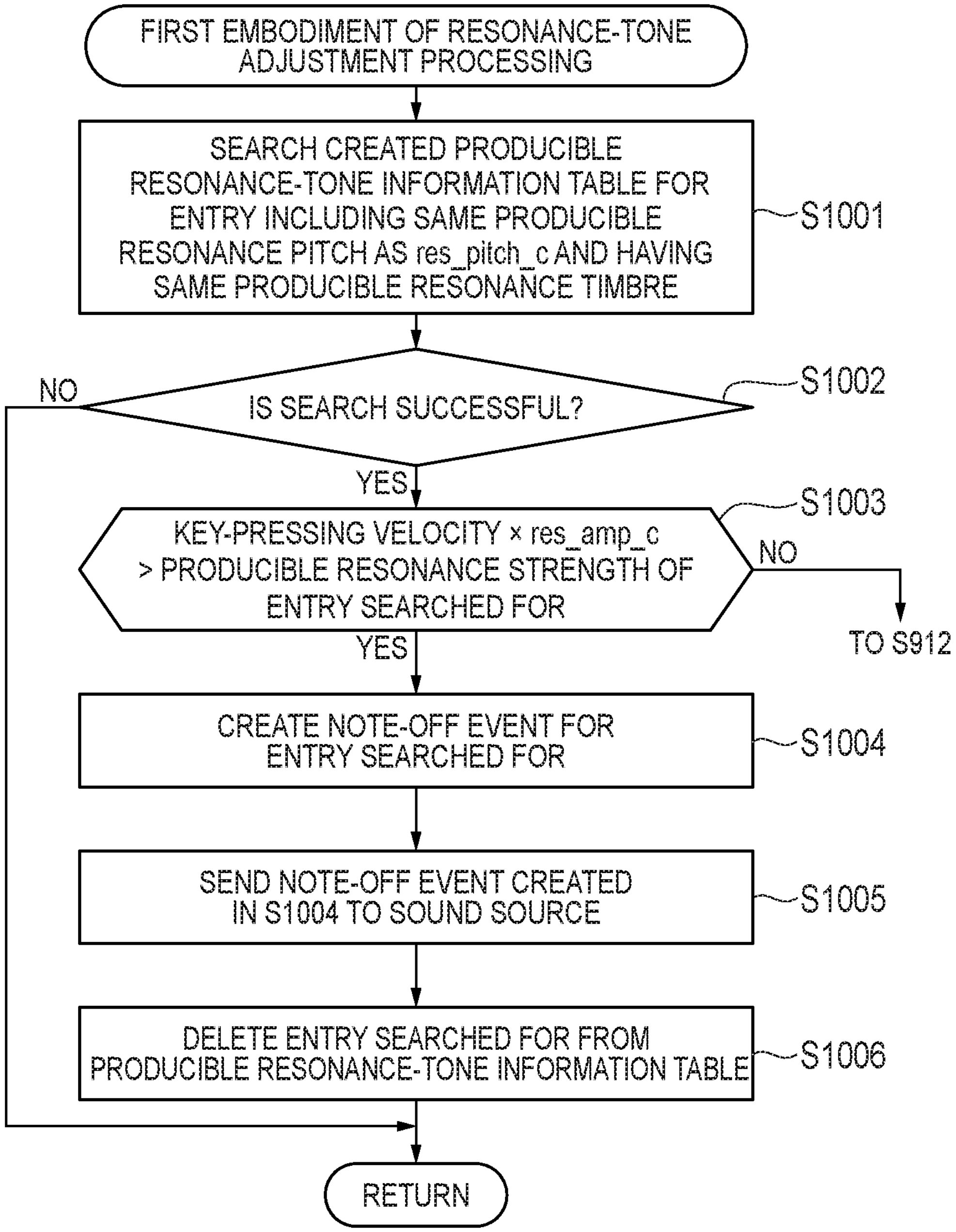
FIG. 10 is a flowchart of a detailed example of a first embodiment of resonance-tone adjustment processing.

FIG. 10 is a flowchart of a detailed example of a first embodiment of the resonance-tone adjustment processing in step S910 of FIG. 9. The CPU 101 first searches the producible resonance-tone information table data corresponding to other key pressing created in advance on the RAM 103, for an entry including the same producible resonance pitch as the resonance-pitch candidate value res_pitch_c to be registered as producible resonance-tone information table data after the processing in step S907 or S909 of FIG. 9 and having the same producible resonance timbre (step S1001).

Next, the CPU 101 determines whether or not the search is successful in step S1001 (step S1002).

In a case where the determination in step S1002 results in NO, resonance-tone adjustment is not particularly required, and thus the CPU 101 directly terminates the resonance-tone adjustment processing in step S910 of FIG. 9 exemplified with the flowchart of FIG. 10.

In a case where the determination in step S1002 results in YES, the CPU 101 determines whether or not the value obtained by multiplying the key-pressing velocity detected in step S701 of FIG. 7 by the resonance-strength-ratio candidate value res_amp_c to be registered as producible resonance-tone information table data after the processing in step S907 or S909 of FIG. 9 is larger than of the producible resonance strength of any entry identical in pitch searched for in step S1001 (refer to FIG. 5C) (step S1003).

In a case where the determination in step S1003 results in NO, without registration to the producible resonance-tone information table data this time, the CPU 101 proceeds to step S912 of FIG. 9 and increments the value of the key-number variable value N by 1.

In a case where the determination in step S1003 results in YES, based on the producible resonance pitch of the entry in the producible resonance-tone information table data searched for in step S1001, the CPU 101 creates a note-off event for the resonance tone corresponding to the producible resonance pitch (step S1004) and sends the note-off event to the sound source LSI 106 (step S1005). When receiving the note-off event, the sound source LSI 106 performs tone-mute processing of stopping the output of the waveform data of the resonance tone from the waveform generation device 210 with the tone-production channel corresponding to the producible resonance pitch in the note-off event.

Finally, the CPU 101 deletes, from the producible resonance-tone information table data, the entry in the producible resonance-tone information table data searched for in step S1001 (step S1006). This leads to priority on production of the resonance tone due to the key pressing this time. After that, the CPU 101 terminates the resonance-tone adjustment processing in step S910 of FIG. 9 exemplified with the flowchart of FIG. 10 and proceeds to the processing for registration to the producible resonance-tone information table data in step S911 of FIG. 9.

Figure 11:
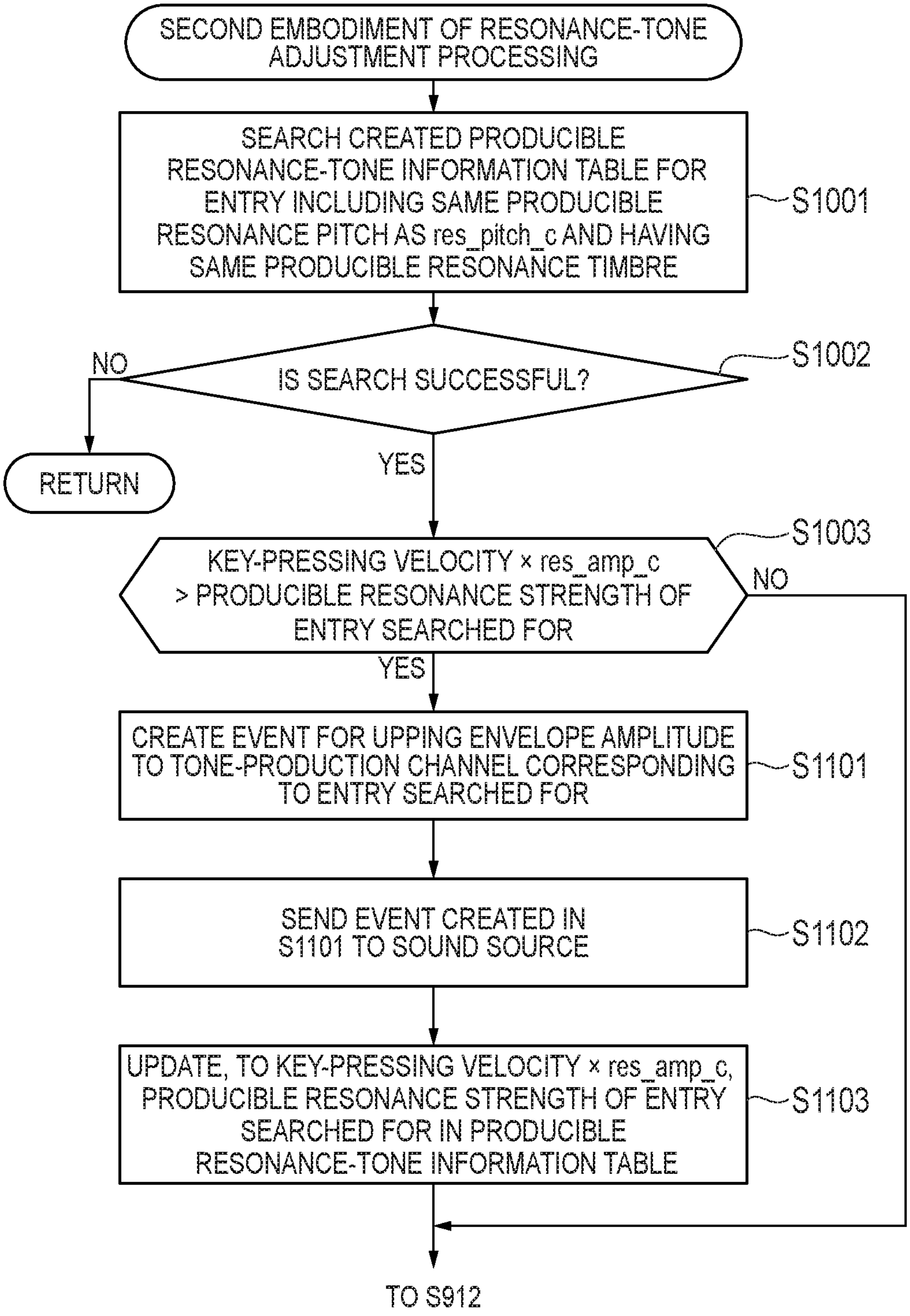
FIG. 11 is a flowchart of a detailed example of a second embodiment of resonance-tone adjustment processing.

FIG. 11 is a flowchart of a detailed example of a second embodiment of the resonance-tone adjustment processing in step S910 of FIG. 9. Steps S1001, S1002, and S1003 of FIG. 11 are similar to those in the first embodiment of FIG. 10.

In a case where the determination in step S1003 results in YES, the CPU 101 creates an event for upping the amplitude envelope to the tone-production channel of the producible resonance pitch of the entry in the producible resonance-tone information table data searched for in step S1001 (step S1101) and sends the event to the sound source LSI 106 (step S1102). When receiving the event, the sound source LSI 106 controls the DSP 202 to perform processing of upping the amplitude envelope of the tone-production channel corresponding to the producible resonance pitch in the event.

Finally, the CPU 101 updates (Step S1103), to the value obtained by multiplying the key-pressing velocity detected in step S701 of FIG. 7 by the resonance-strength-ratio candidate value res_amp_c, the producible resonance strength of the entry in the producible resonance-tone information table data searched for in step S1001. After that, without registration to the producible resonance-tone information table data this time, the CPU 101 proceeds to step S912 of FIG. 9 and increments the value of the key-number variable value N by 1.

Figure 12:
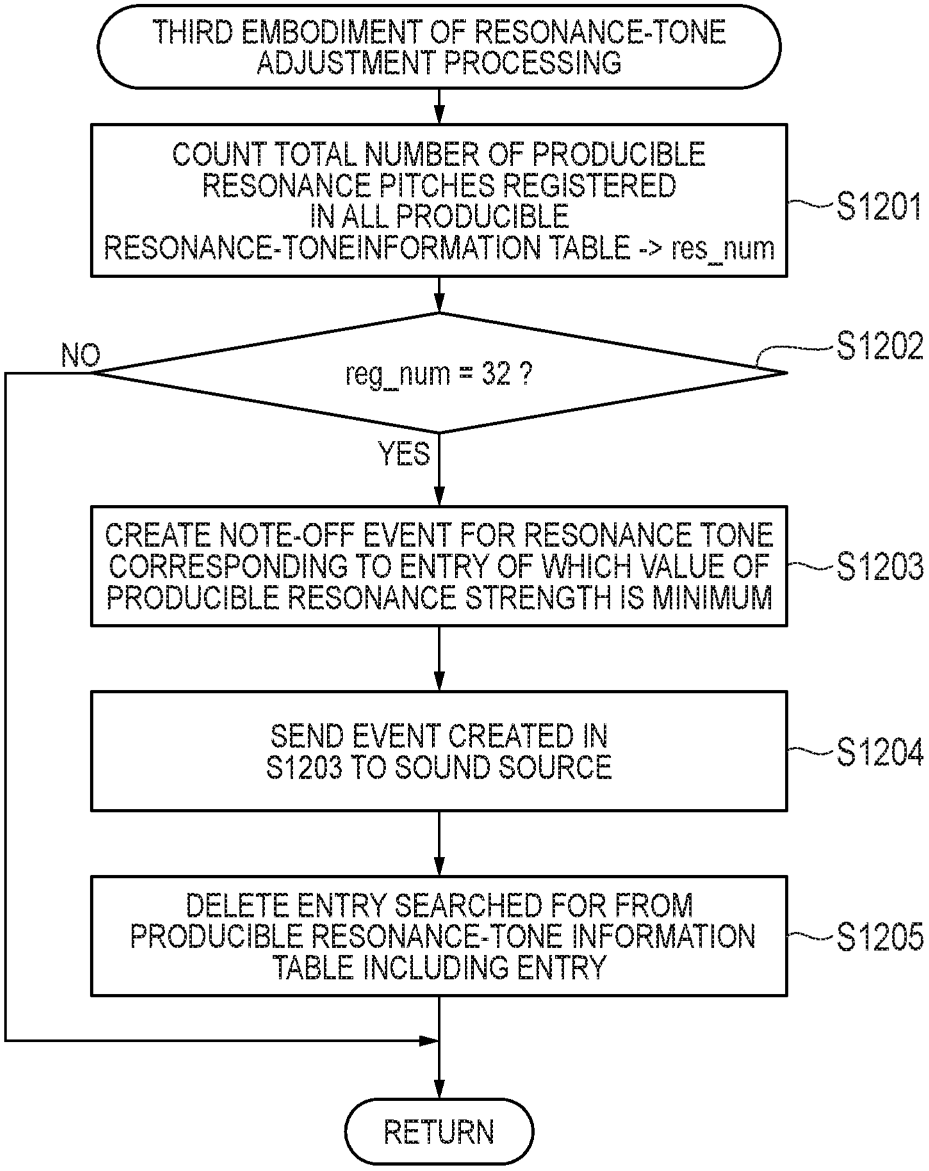
FIG. 12 is a flowchart of a detailed example of a third embodiment of resonance-tone adjustment processing.

FIG. 12 is a flowchart of a detailed example of a third embodiment of the resonance-tone adjustment processing in step S910 of FIG. 9. First, the CPU 101 counts the total number of producible resonance pitches registered in all the producible resonance-tone information table data created in advance on the RAM 103 and stores, in the variable res_num on the RAM 103, a result from the counting (step S1201).

Next, the CPU 101 determines whether or not the count value res_num in step S1201 has reached the allowable maximum value for resonance tones, such as 32 (step S1202).

In a case where the determination in step S1202 results in NO, resonance-tone adjustment is not particularly required, and thus the CPU 101 directly terminates the resonance-tone adjustment processing in step S910 of FIG. 9 exemplified with the flowchart of FIG. 12.

In a case where the determination in step S1202 results in YES, the CPU 101 creates a note-off event for the resonance tone corresponding to the producible resonance pitch of the entry corresponding to a producible resonance strength of which the value is minimum among the producible resonance strengths registered in the producible resonance-tone information table data created in advance on the RAM 103 (step S1203) and sends the note-off event to the sound source LSI 106 (step S1204). When receiving the note-off event, the sound source LSI 106 performs tone-mute processing of stopping the output of the waveform data of the resonance tone from the waveform generation device 210 with the tone-production channel corresponding to the producible resonance pitch in the note-off event.

Finally, the CPU 101 deletes the entry searched for in step S1203 from the producible resonance-tone information table data including the entry, on the RAM 103 (step S1205). This leads to priority on production of the resonance tone due to the key pressing this time, in the range of the maximum number of producible resonance tones (e.g., 32 tone-production channels). After that, the CPU 101 terminates the resonance-tone adjustment processing in step S910 of FIG. 9 exemplified with the flowchart of FIG. 12 and proceeds to the processing for registration to the producible resonance-tone information table data in step S911 of FIG. 9.

According to the embodiments described above, even with a string damped, a resonance tone is produced, and furthermore, depending on the state of the string released, a resonance tone is produced with a change in resonance-string frequency, resonance tone volume, or resonance timbre, so that a more acoustic resonance can be obtained.

In the embodiments described above, the electronic piano has been exemplarily given. However, the present invention can be applied to various electronic musical instruments, such as electronic stringed instruments.

The embodiments of the disclosure and the advantages thereof have been described in detail above. Those skilled in the art can make various alterations, additions, and omissions without departing from the scope of the present invention in the claims.

In addition, the present invention is not limited to the embodiments described above, and thus various modifications can be made at embodiment phases without departing from the gist thereof. The functions in each embodiment described above may be appropriately combined wherever possible for implementation. Each embodiment described above includes various steps, and variously appropriate combinations of a plurality of constituent elements in the disclosure can be included in the invention. For example, even if some constituent elements are omitted from all the constituent elements in an embodiment, as long as an effect can be obtained, the configuration excluding the constituent elements can be included in the invention.

What is claimed is:

1. An electronic musical instrument comprising:

a plurality of keys including a first key and one or more second keys, each second key having a pitch in a harmonic relationship with a pitch of the first key; and at least one processor configured to:

decide, in response to an operation of the first key, whether a respective second key is in a damped state or in a non-damped state;

generate, in a case where the respective second key is in the non-damped state, a first resonance tone with at least one of a first resonance pitch and a first timbre; and generate, in a case where the respective second key is in the damped state, a second resonance tone with at least one of a second resonance pitch and a second timbre, wherein the first resonance tone and the second resonance tone are generated based on a resonance strength ratio at a pitch difference between the first key and the respective second key.

2. The electronic musical instrument according to claim 1, wherein the one or more second keys comprise a plurality of second keys.

3. The electronic musical instrument according to claim 1, wherein the second resonance pitch corresponding to the respective second key is higher than the first resonance pitch.

4. The electronic musical instrument according to claim 1, wherein the first resonance tone and the second resonance tone are generated based on resonance strength information set to the respective second key, and wherein the resonance strength information differs depending on whether the pitch of the respective second key is twice or three times the pitch of the first key.

5. The electronic musical instrument according to claim 1, wherein:

the non-damped state is set due to turning a damper pedal on or is set to an operated key; and the damped state is set to an unoperated key due to the damper pedal off.

6. The electronic musical instrument according to claim 1, wherein:

when generating, in response to new key pressing during production of a musical tone including the first resonance tone or the second resonance tone, a new resonance tone corresponding to the respective second key, the electronic musical instrument compares a first velocity of the first resonance tone or the second resonance tone during the production with a second velocity of the new resonance tone to be generated in response to the new key pressing, wherein the musical tone is produced by synthesizing a musical tone corresponding to the first key and the first resonance tone or the second resonance tone; and the electronic musical instrument controls the generation of the new resonance tone, based on a result of the comparison.

7. A method of controlling an electronic musical instrument that includes at least one processor and a plurality of keys that includes a first key and one or more second keys, each second key having a pitch in a harmonic relationship with a pitch of the first key, the method comprising, via the at least one processor:

deciding, in response to an operation of the first key, whether a respective second key is in a damped state or in a non-damped state;

generating, in a case where the respective second key is in the non-damped state, a first resonance tone with at least one of a first resonance pitch and a first timbre; and generating, in a case where the respective second key is in the damped state, a second resonance tone with at least one of a second resonance pitch and a second timbre, wherein the first resonance tone and the second resonance tone are generated based on a resonance strength ratio at a pitch difference between the first key and the respective second key.

8. The method according to claim 7, wherein the one or more second keys comprise a plurality of second keys.

9. The method according to claim 7, wherein the second resonance pitch corresponding to the respective second key is higher than the first resonance pitch.

10. The method according to claim 7, wherein the first resonance tone and the second resonance tone are generated based on resonance strength information set to the respective second key, and wherein the resonance strength information differs depending on whether the pitch of the respective second key is twice or three times the pitch of the first key.

11. The method according to claim 7, wherein;

the non-damped state is set due to turning a damper pedal on or is set to an operated key; and the damped state is set to an unoperated key due to the damper pedal off.

12. The method according to claim 7, comprising:

when generating, in response to new key pressing during production of a musical tone including the first resonance tone or the second resonance tone, a new resonance tone corresponding to the respective second key, comparing a first velocity of the first resonance tone or the second resonance tone during the production with a second velocity of the new resonance tone to be generated in response to the new key pressing, wherein the musical tone is produced by synthesizing a musical tone corresponding to the first key and the first resonance tone or the second resonance tone; and controlling the generation of the new resonance tone, based on a result of the comparison.

13. A non-transitory computer-readable storage medium having stored thereon a program executable by at least one processor in an electronic musical instrument that includes, in addition to the at least one processor, a plurality of keys that includes a first key and one or more second keys, each second key having a pitch in a harmonic relationship with a pitch of the first key, the program being configured for causing the at least one processor to perform the following:

deciding, in response to an operation of the first key, whether a respective second key is in a damped state or in a non-damped state;

generating, in a case where the respective second key is in the non-damped state, a first resonance tone with at least one of a first resonance pitch and a first timbre; and generating, in a case where the respective second key is in the damped state, a second resonance tone with at least one of a second resonance pitch and a second timbre, wherein the first resonance tone and the second resonance tone are generated based on a resonance strength ratio at a pitch difference between the first key and the respective second key.

* * * * *